US010313146B2

(12) United States Patent
Rashid et al.

(10) Patent No.: US 10,313,146 B2
(45) Date of Patent: Jun. 4, 2019

(54) COMMUNICATION METHOD AND COMMUNICATION APPARATUS

(71) Applicant: Panasonic Intellectual Property Management Co., Ltd., Osaka (JP)

(72) Inventors: Mahbub Rashid, Kyoto (JP); Masaru Yamaoka, Osaka (JP); Yasuaki Kanari, Shizuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 682 days.

(21) Appl. No.: 14/413,346

(22) PCT Filed: May 9, 2014

(86) PCT No.: PCT/JP2014/002475
§ 371 (c)(1),
(2) Date: Jan. 7, 2015

(87) PCT Pub. No.: WO2014/185041
PCT Pub. Date: Nov. 20, 2014

(65) Prior Publication Data
US 2015/0195101 A1 Jul. 9, 2015

(30) Foreign Application Priority Data
May 13, 2013 (JP) .................... 2013-101674

(51) Int. Cl.
*H04L 12/28* (2006.01)
*H04W 4/80* (2018.01)
(Continued)

(52) U.S. Cl.
CPC .......... *H04L 12/2816* (2013.01); *G05B 15/02* (2013.01); *G08C 17/02* (2013.01); *H04W 4/80* (2018.02); *G08C 2201/21* (2013.01)

(58) Field of Classification Search
CPC ....................................................... H04L 12/28
(Continued)

(56) References Cited

U.S. PATENT DOCUMENTS

| 8,269,376 B1* | 9/2012 | Elberbaum | H01H 9/167 307/115 |
| 9,021,247 B2* | 4/2015 | Jin | H04L 63/0428 713/150 |
| 9,111,098 B2* | 8/2015 | Smith | G06F 21/00 |
| 2008/0034081 A1* | 2/2008 | Marshall | G08C 17/02 709/223 |

(Continued)

FOREIGN PATENT DOCUMENTS

| JP | 2006-295390 | 10/2006 |
| JP | 3989467 | 10/2007 |

(Continued)

OTHER PUBLICATIONS

International Search Report dated Aug. 12, 2014 in International Application No. PCT/JP2014/002475.

*Primary Examiner* — Tejal Gami
(74) *Attorney, Agent, or Firm* — Wenderoth, Lind & Ponack, L.L.P.

(57) ABSTRACT

A communication method includes: performing communication with a server via the Internet; acquiring from the server a command for causing an electrical appliance to perform a predetermined operation; storing the command and an association information item associated with the command; displaying the association information items on a display unit; receiving a selection of an association information item among the displayed association information items; determining whether or not the electrical appliance is capable of performing the predetermined operation according to the command associated with the association information item the selection of which is received; and when it is determined that the electrical appliance is capable of performing the predetermined operation according to the (Continued)

command associated with the association information item the selection of which is received, transmitting the command to the electrical appliance.

12 Claims, 14 Drawing Sheets

(51) Int. Cl.
*G08C 17/02* (2006.01)
*G05B 15/02* (2006.01)

(58) Field of Classification Search
USPC ........... 700/90; 709/203, 223; 715/740, 744, 715/765, 835
See application file for complete search history.

(56) References Cited

U.S. PATENT DOCUMENTS

| | | | |
|---|---|---|---|
| 2010/0070086 A1* | 3/2010 | Harrod | F24F 11/0086 700/276 |
| 2011/0047493 A1 | 2/2011 | Sung et al. | |
| 2011/0074589 A1* | 3/2011 | Han | H04L 12/2825 340/618 |
| 2012/0296488 A1* | 11/2012 | Dharwada | H02J 13/001 700/296 |

FOREIGN PATENT DOCUMENTS

| | | |
|---|---|---|
| JP | 2011-45085 | 3/2011 |
| JP | 2012-49593 | 3/2012 |
| JP | 5173088 | 3/2013 |

\* cited by examiner

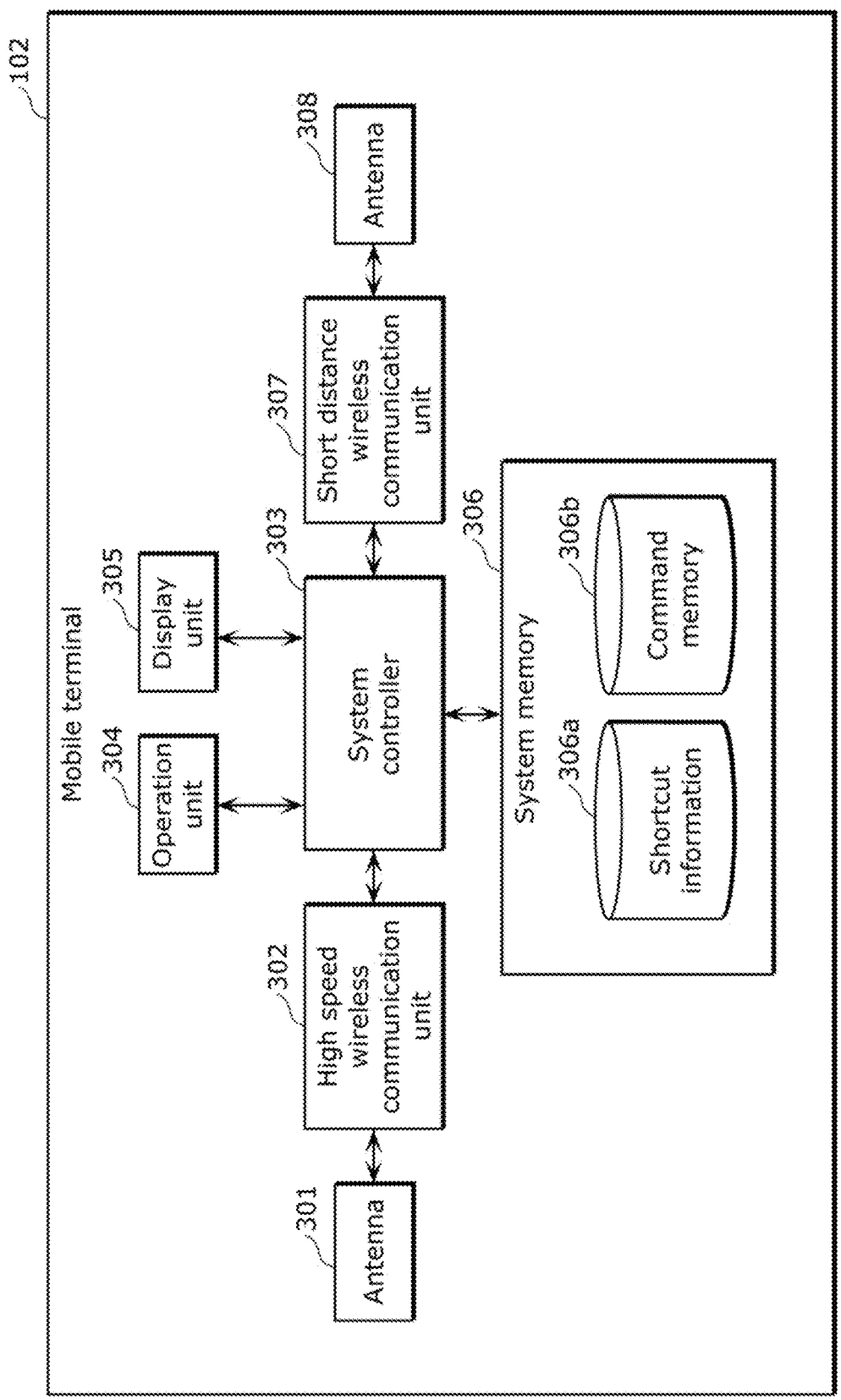

FIG. 11

| Shortcut ID | Appliance identification information | Icon URL | Command |
|---|---|---|---|
| 001 | AAA (Washing machine) | http://dummy.com/wash.png | ※ Encrypted command {Washing to drying, Intensive, 8:15} |
| 002 | BBB (Rice cooker) | http://dummy.com/rice.png | ※ Encrypted command {White rice, Firmer, 6:30} |
| | | | |

COMMUNICATION METHOD AND COMMUNICATION APPARATUS

BACKGROUND OF THE INVENTION

1. Technical Field

The present disclosure relates to a communication method and a communication apparatus for operating a home appliance via wireless communication.

2. Description of the Related Art

One example of the conventional methods for operating a home appliance using a mobile terminal is a method of generating, by a server, a command for operating the home appliance (see, for example, Japanese Patent No. 5173088). JP 5173088 discloses a communication system for generating, by a server, a command for operating a home appliance, and setting the generated command on the home appliance via near filed communication (NFC), thereby enabling operation of the home appliance according to the command.

SUMMARY OF THE INVENTION

1. Technical Problem

However, the conventional configuration poses a problem that operational burden imposed on a user for generating a command by a server increases, and a problem that power consumption of a mobile terminal (communication apparatus) increases.

The present disclosure presents a solution to the above-described conventional problems and has an object to provide a communication method which enables alleviating the operational burden imposed on a user and reducing power consumption.

2. Solution to the Problem

In order to solve the above-described conventional problems, a communication method according to an aspect of the present disclosure is a communication method for operating an electrical appliance, the method including: performing communication with a server via the Internet, acquiring a command from the server in the communication performed in the performing of communication, the command being for causing the electrical appliance to perform a predetermined operation, storing in a storage unit the command acquired in the acquiring and an association information item associated with the command; displaying on a display unit a plurality of the association information items stored in the storing; receiving a selection of an association information item among the plurality of the association information items displayed in the displaying; determining whether or not the electrical appliance is capable of performing the predetermined operation according to the command associated with the association information item the selection of which is received in the receiving; and when it is determined that the electrical appliance is capable of performing the predetermined operation according to the command associated with the association information item the selection of which is received in the receiving, transmitting the command to the electrical appliance.

It is to be noted that these generic and specific aspects may be implemented using a system, an apparatus, an integrated circuit, a computer program, or a computer-readable recording medium such as a compact disc read only memory (CD-ROM), and may also be implemented by any combination of systems, apparatuses, integrated circuits, computer programs, and recording media.

3. Advantageous Effects of the Invention

According to a communication method and a communication apparatus according to the present disclosure, it is possible to alleviate the operational burden imposed on a user and reduce power consumption.

BRIEF DESCRIPTION OF THE DRAWINGS

FIG. 3 is a block diagram illustrating a configuration of a mobile terminal 102 of the communication system 1.

FIG. 11 is a table illustrating shortcut information.

Figure 1:
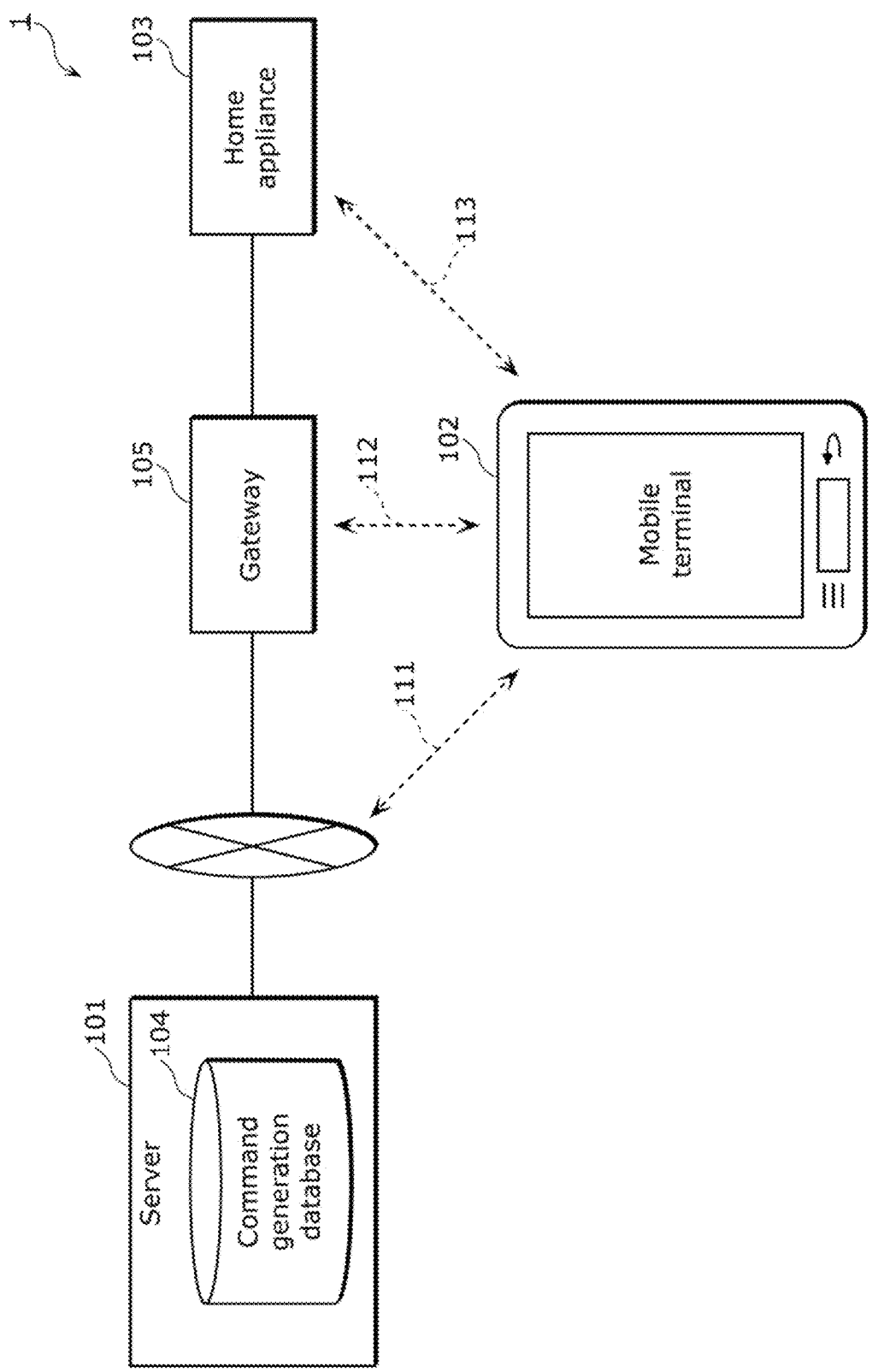
FIG. 1 is a schematic diagram illustrating an example of a communication system including a communication apparatus according to an embodiment.

DETAILED DESCRIPTION OF THE INVENTION (Underlying Knowledge Forming Basis of the Present Disclosure)

In relation to the communication system disclosed in the Background section, the inventors have found the problem described below.

In order to operate a home appliance, a user is required each time to configure settings for operating the home appliance via a screen image flow. This poses a problem that operational burden is imposed on the user. In addition, since it is necessary to communicate with a server for each configuration of the settings for operating the home appliance, there is a possibility that congestion of communication traffic arises. Furthermore, since it is necessary to wait for a response from the server, there is a problem that power consumption of the mobile terminal increases.

In order to solve the above-described problems, a communication method according to an aspect of the present disclosure is a communication method for operating an electrical appliance, the method including: performing communication with a server via the Internet, acquiring a command from the server in the communication performed in the performing of communication, the command being for causing the electrical appliance to perform a predetermined operation, storing in a storage unit the command acquired in the acquiring and an association information item associated with the command; displaying on a display unit a plurality of the association information items stored in the storing; receiving a selection of an association information item among the plurality of the association information items displayed in the displaying; determining whether or not the electrical appliance is capable of performing the predetermined operation according to the command associated with the association information item the selection of which is received in the receiving; and when it is determined that the electrical appliance is capable of performing the predetermined operation according to the command associated with the association information item the selection of which is received in the receiving, transmitting the command to the electrical appliance.

With this, even with a system which causes a server to generate a command for operating a home appliance, it is possible to operate the home appliance without a cumbersome operation, by causing a storage unit of a communication apparatus to store, for example, a command as an association information item such as a shortcut.

For example, the command may be a command for causing the electrical appliance to perform, as the predetermined operation, a combination of operation conditions defined by a user.

With this, it is possible to store a command indicating a combination of a plurality of operation conditions, thereby allowing a user to operate a home appliance without a cumbersome operation.

For example, the command may include the predetermined operation to be performed by the electrical appliance and time information related to a start time for starting the performing of the predetermined operation, and in the determining, it may be determined that the electrical appliance is capable of performing the predetermined operation when a current time is not past the start time acquired from the time information, and it may be determined that the electrical appliance is incapable of performing the predetermined operation when the current time is past the start time.

With this, in the case where it is determined that a predetermined operation cannot be performed, it is possible to cause an electrical appliance to perform the predetermined operation at another time, by notifying a user of changing of the settings of a start time, for example.

For example, in the acquiring, a current season or weather information may be further acquired in the communication, and in the determining, the determining may be performed according to whether or not the current season or the weather information satisfies a condition for the electrical appliance to perform the predetermined operation.

With this, it is possible to cause a home appliance to perform a suitable operation according to the season or the weather information.

For example, in the acquiring, a location at which the electrical appliance is placed may be further acquired and the weather information of an area including the location may be acquired in the communication, and in the determining, the determining may be performed according to whether or not the weather information satisfies the condition.

For example, in the acquiring, an operation state of the electrical appliance may be further acquired in the communication, and in the determining, it may be determined that the electrical appliance is capable of performing the predetermined operation when the operation state of the electrical appliance acquired in the acquiring indicates that the electrical appliance is not in operation, and it may be determined that the electrical appliance is incapable of performing the predetermined operation when the operation state indicates that the electrical appliance is in operation.

With this, performing of a command is avoided when it is determined that the electrical appliance is in operation, thereby enabling prevention of performing another operation during the currently performed operation.

For example, The communication method described above may further include issuing a notification indicating that the electrical appliance is incapable of performing the predetermined operation, when it is determined, in the determining, that the electrical appliance is incapable of performing the predetermined operation according to the command associated with the association information item the selection of which is received in the receiving.

With this, when a predetermined operation cannot be performed by the electrical appliance, a user receives a notification indicating that it is impossible to perform the predetermined operation, and thus it is possible for the user to easily reset a command for enabling the electrical appliance to perform the predetermined operation.

For example, in the issuing of a notification, a notification including a reason why the electrical appliance is incapable of performing the predetermined operation may be issued as the notification.

With this, a user receives a notification indicating the reason when it is impossible to perform the predetermined operation by an electrical appliance, and thus it is possible for the user to reset a command for enabling the electrical appliance to perform the predetermined operation.

For example, in the acquiring, a command that satisfies a condition for the electrical appliance to be capable of performing the predetermined operation may be acquired from the server in the communication.

With this, it is possible to reacquire a command that can be performed by the electrical appliance, thereby enabling easily performing the command.

In addition, the present disclosure may be implemented as a communication apparatus for operating an electrical appliance, the communication apparatus including: a communication unit configured to communicate with the electrical appliance and also communicate with a server via the Internet; an acquiring unit configured to acquire a command for causing the electrical appliance to perform a predetermined operation, from the server via the communication unit; a storage unit configured to store the command acquired by the acquiring unit and an association information item associated with the command; a display unit configured to display at least one of a plurality of the association information items stored in the storage unit; a receiving unit configured to receive a selection of an association information item among the plurality of the association information items displayed on the display unit; and a determining unit configured to determine whether or not the electrical appliance is capable of performing the predetermined operation according to the command associated with the association information item the selection of which is received by the receiving unit, wherein the communication unit is configured to transmit the command to the electrical appliance when the determining unit determines that the electrical appliance is capable of performing the predetermined operation according to the command.

For example, the communication unit may include: a first communication unit configured to communicate with the electrical appliance without involving the Internet; and a second communication unit configured to communicate with the server or the electrical appliance via the Internet.

With this, it is possible to communicate with a server and an electrical appliance at the same time, thereby reducing the time taken for communication.

These general and specific aspects may be implemented using a system, an apparatus, an integrated circuit, a computer program, or a computer-readable recording medium such as a compact disc read only memory (CD-ROM), or any combination of systems, apparatuses, integrated circuits, computer programs, or computer-readable recording media.

Hereinafter, certain exemplary embodiments of a communication method and a communication apparatus according to an aspect of the present disclosure are described in greater detail with reference to the accompanying Drawings.

It is to be noted that each of the embodiment and the modification examples described below shows a preferred example of the present disclosure. The numerical values, shapes, materials, structural elements, the arrangement and connection of the structural elements, steps, the processing order of the steps, and so on, shown in the following embodiment are mere examples, and therefore do not limit the present disclosure. In addition, among the structural elements in the following embodiments, structural elements not recited in any one of the independent claims are described as arbitrary structural elements.

Embodiment

FIG. 1 is a schematic diagram illustrating an example of a communication system including a communication apparatus according to an embodiment.

The communication system 1 includes a server 101, a mobile terminal 102, a gateway 105, and a home appliance 103.

The server 101 performs login processing (authentication function) for a plurality of users, manages a list of registered home appliances of each of the plurality of users, and generating a home appliance operation command, based on a request from the mobile terminal 102. The server 101 has a command generation database 104 for generating a command.

The login processing is authentication processing in which a request for an ID and a password is issued to each of the plurality of users, and separately providing an already registered user with various functions. The server 101 provides, for example, various functions to a user whose ID and password are confirmed to be correct. In management of the list of registered home appliances, a user ID and a home appliance owned by the user are associated with each other and stored in the server 101.

In addition, the server 101 generates a command for operating a home appliance 103 (in other words, for causing a home appliance to perform a predetermined operation). The command is, when a home appliance 103 is, for example, a washing machine, a command for causing the washing machine to perform an operation such as "washing to drying, course: intensive wash, preset time 8:15", or the like. A command generated by the server 101 is set in the home appliance 103 via the mobile terminal 102, so as to be used. In other words, the home appliance 103 acquires a command generated by the server 101 via the mobile terminal 102, thereby performing the operation indicated by the command.

This allows a user to operate the home appliance 103 using a mobile terminal 102, without involving an operation on an operation panel of the home appliance 103. More specifically, a user is allowed to configure complicated settings of the home appliance 103 using a mobile terminal 102 such as a smartphone which implements a rich user interface, and thus it is possible to improve convenience for the user. In addition, the mobile terminal 102 is generally capable of connecting to the Internet and providing a user with a variety of information items related to the functions of the home appliance 103, and the user is allowed to operate the home appliance 103 in consideration of the information items when operating the home appliance 103. More specifically, the mobile terminal 102, for example, displays weather forecast for the day on an operation screen of a washing machine, thereby enabling presenting of, to a user, information for making decision whether or not to perform drying after washing. As described above, the mobile terminal 102 can be a controller which provides a much more excellent usability than the operation panel of the home appliance 103.

In addition, a command for the home appliance 103 is generated by the server 101 in the communication system 1, and thus the generating of a command is less easily cryptanalyzed than in the case where a command is generated by a smartphone. When generating of a command is cryptanalyzed, information for generating the command for the home appliance 103 leak. If an application capable of controlling the home appliance 103 is distributed to a malicious third party or the like, there is a possibility that a loss is inflicted on a user who uses the home appliance 103.

In addition, the server 101 generates a command in an encrypted manner, for the same reason. The encrypted command is acquired by the home appliance 103 and then decrypted in the home appliance 103. The server 101 generates a command in an encrypted manner, thereby making it possible to prevent leakage of details indicated by the command in a communication path between the server 101 and the mobile terminal 102 or in the mobile terminal 102.

The mobile terminal 102 is, for example, a common smartphone. The mobile terminal 102 is capable of performing high speed wireless communication and short distance wireless communication for connecting to the Internet. The high speed wireless communication specifically includes, communication using a mobile phone communication network (for example, the second-generation mobile communication system (2G), the third-generation mobile communication system (3G), the fourth-generation mobile communication system (4G), or the like). The short distance wireless communication includes communication using NFC, Bluetooth (registered trademark), Wi-Fi, or the like.

More specifically, the mobile terminal 102 is capable of communicating with the server 101 via the Internet or communicating with the home appliance 103 via the Internet and the gateway 105, in the high speed wireless communication (see a dashed arrow 111). In addition, the mobile terminal 102 is capable of communicating with the home appliance 103 by communicating with the gateway 105 using Wi-Fi in the short distance wireless communication (see a dashed arrow 112), or directly communicating with the home appliance 103 using NFC, Bluetooth (registered trademark), Wi-Fi, or the like (see a dashed arrow 113). In particular, by communicating with the home appliance 103 using NFC or Bluetooth (registered trademark), it is possible to implement operation of the home appliance 103 with an easy and intuitive operation of touching or approximating the mobile terminal 102 to the home appliance 103.

The mobile terminal 102 receives a control by an application installed therein in communicating with the server 101 or the home appliance 103. The application is mostly a so-called web application executed on a browser. The content displayed on a browser is managed by the server 101. Thus, even when the content of service needs to be modified or extended, it can be addressed by upgrading the content on the server 101 without upgrading the application itself.

The home appliance 103 refers to a common home appliance such as a washing machine and a rice cooker. It is to be noted that an electrical appliance other than a home appliance may be employed instead of the home appliance 103. The home appliance 103, in general, includes an operation panel on which a user performs input, thereby enabling setting a command for operating the home appliance 103. In addition to this, the communication system 1 is capable of receiving a command set by the mobile terminal 102 through communication with the mobile terminal 102, thereby allowing performing of an operation based on the command. With this, the communication system 1 enables operating the home appliance 103 using the mobile terminal 102 including a rich user interface, such as a smartphone.

The gateway 105 is, for example, a wireless local area network (LAN) router, or the like, and is a device enabling mutual connections of communication using the Internet and communication using LAN for one's home. The gateway 105 and the home appliance 103 communicate with each other using LAN for one's home. The communication using the LAN may be implemented using a wired communication according to the standard of Ethernet (registered trademark), or using a wireless communication according to the standard of Wi-Fi, Bluetooth (registered trademark), or the like.

In the communication system 1, a command once generated in the server 101 is stored in the mobile terminal 102, thereby minimizing the number of times of communication between the mobile terminal 102 and the server 101. More specifically, the mobile terminal 102 holds the command which is generated and encrypted by the server 101. In addition, the command which is held is presented to a user as a shortcut, and the user is capable of operating the home appliance simply by selecting a desired shortcut from a list of shortcuts drawn on the display unit of the mobile terminal 102 and touching or approximating the mobile terminal 102 to the home appliance.

Figure 2A:
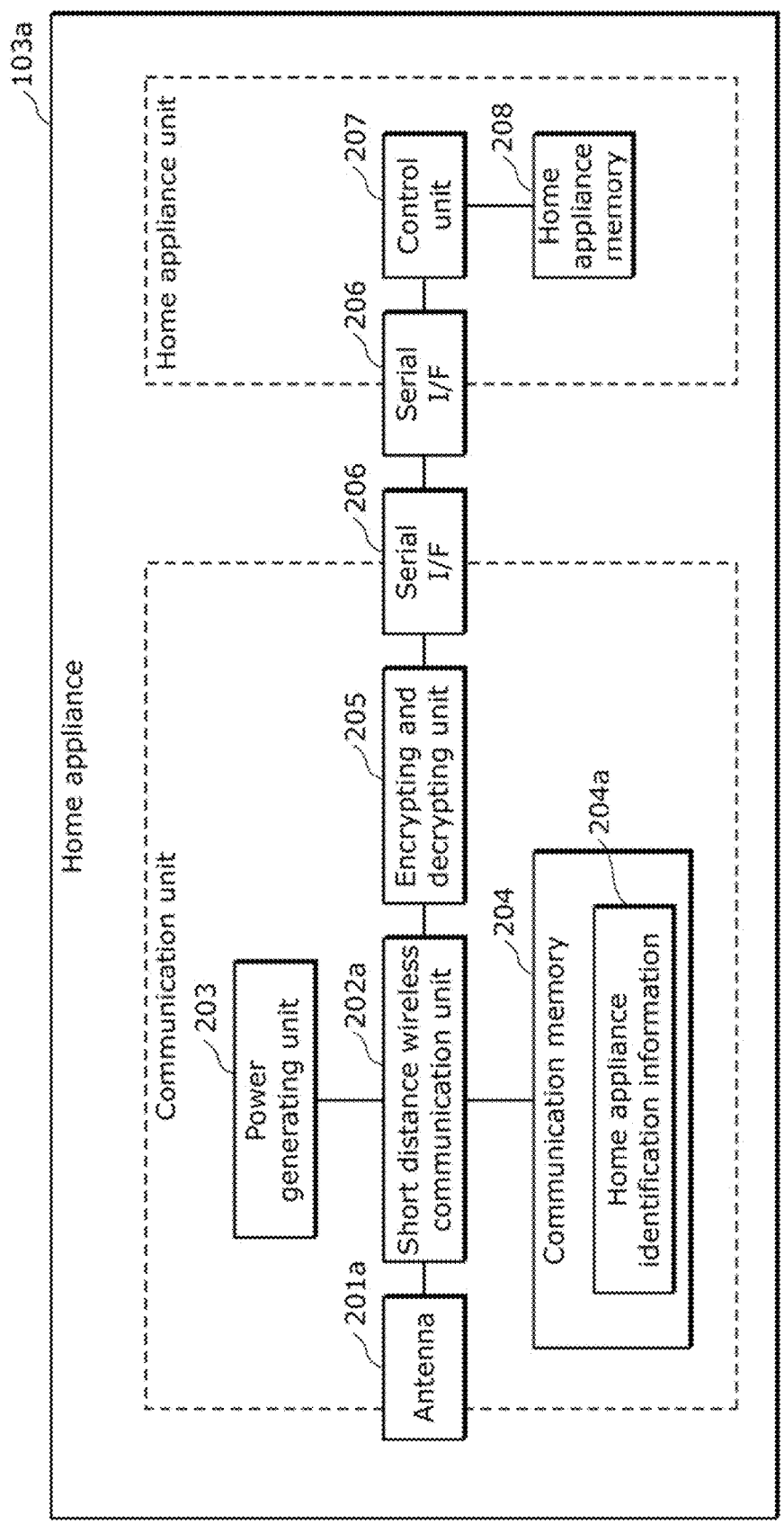
FIG. 2A is a block diagram illustrating a configuration of a home appliance 103a of a communication system 1.
Figure 2B:
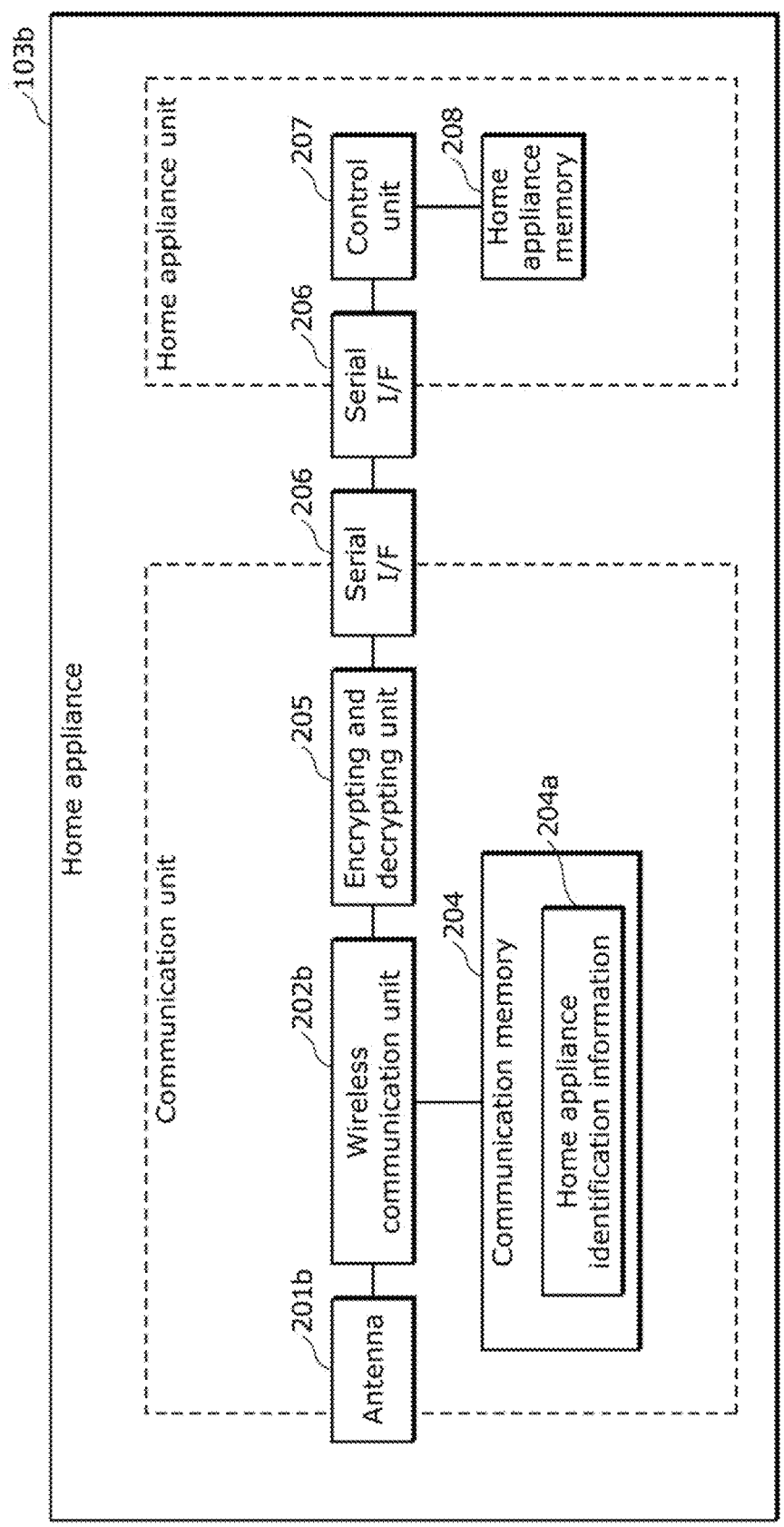
FIG. 2B is a block diagram illustrating a configuration of a home appliance 103b of the communication system 1.

FIG. 2A is a block diagram illustrating a configuration of a home appliance 103a of the communication system 1. FIG. 2B is a block diagram illustrating a configuration of a home appliance 103b of the communication system 1. The home appliance 103 described in FIG. 1 may be implemented as the home appliance 103a illustrated in FIG. 2A, or may be implemented as the home appliance 103b illustrated in FIG. 2B.

The home appliance 103a includes: an antenna 201a; a short distance wireless communication unit 202a; a power generating unit 203; a communication memory 204; an encrypting and decrypting unit 205; a serial I/F 206; a control unit 207; and a home appliance memory 208.

The antenna 201a is an antenna for performing short distance wireless communication with the mobile terminal 102. The antenna 201a is configured of a loop antenna when the short distance wireless communication corresponds to NFC. The antenna 201a receives a radio wave outputted from the mobile terminal 102 and outputs the radio wave to the short distance wireless communication unit 202a.

The short distance wireless communication unit 202a amplifies or demodulates the radio wave received by the antenna 201a from the mobile terminal 102, thereby converting the radio wave into a digital signal.

The power generating unit 203 generates power for driving the short distance wireless communication unit 202a according to the radio wave received by the antenna 201a.

The communication memory 204 is a memory configured of a non-volatile memory, and data for performing the short distance wireless communication with the mobile terminal 102 is stored therein. In addition, the communication memory 204 has a read only memory (ROM) region which is registered before shipment. In the ROM region, at least home appliance identification information 204a for identifying the home appliance 103 is stored. Accordingly, the mobile terminal 102 first reads the home appliance identification information 204a from the communication memory 204 in the home appliance 103 through the short distance wireless communication, thereby making it possible to identify a home appliance 103 which performs the short distance wireless communication.

The encrypting and decrypting unit 205 decrypts an encrypted command received by the mobile terminal 102, and on the other hand encrypts information (ecological information, information indicating a state of the home appliance 103 such as an error code, and the like) to be transmitted to the mobile terminal 102.

The serial I/F 206 is a serial line connecting a communication unit and a home appliance unit of the home appliance 103 so that the communication unit and the home appliance unit can communicate with each other. The home appliance operation command received from the mobile terminal 102 is decrypted by the encrypting and decrypting unit 205, and then transmitted to the control unit 207 via the serial I/F 206.

The control unit 207 is a controller which controls the home appliance 103 and is configured of a microcontroller. The control unit 207 causes a home appliance to operate (control) according to a command received from the mobile terminal 102. In the case where the home appliance 103 is a washing machine, for example, in response to a command "washing to drying, course: intensive, preset time 8:15", an operation (control) that "washing to drying is carried out in an intensive course and the operation will be complete at 8:15" is performed.

The home appliance memory 208 is a memory for storing home appliance information, and stores firmware for controlling the home appliance 103 by the control unit 207 and a state of the home appliance 103.

The home appliance 103b includes: an antenna 201b; a wireless communication unit 202b; a communication memory 204; an encrypting and decrypting unit 205; a serial I/F 206; a control unit 207; and a home appliance memory 208. The home appliance 103b is different from the home appliance 103a in that the home appliance 103b includes the antenna 201b and the wireless communication unit 202b instead of the antenna 201a and the short distance wireless communication unit 202a of the home appliance 103a, and that the power generating unit 203 is not included. Other components in the configuration are the same as the components of the home appliance 103a, and thus description for them will be omitted.

The antenna 201b is an antenna for performing communication with the gateway 105 or the mobile terminal 102 using Wi-Fi, Bluetooth (registered trademark), or other wireless standards.

The wireless communication unit 202b controls information transmitted and received by the antenna 201b. Here, modulation and demodulation or error correction of data is carried out.

FIG. 3 is a block diagram illustrating a configuration of the mobile terminal 102 of the communication system 1.

The mobile terminal 102 includes: an antenna 301; a high speed wireless communication unit 302; a system controller 303; an operation unit 304; a display unit 305; a system memory 306; a short distance wireless communication unit 307; and an antenna 308.

The antenna 301 is an antenna for a high speed wireless communication for the mobile terminal 102 to communicate with the server 101. The high speed wireless communication is a communication for connecting to the server 101 via the Internet, and is, for example, a communication network for mobile phones or Wi-Fi.

The high speed wireless communication unit 302 controls information transmitted and received by the antenna 301. Here, modulation and demodulation or error correction of data is carried out.

The system controller 303 is a central processing unit (CPU) of the mobile terminal 102, and controls operations of structural blocks.

The operation unit 304 receives an input by a user for operating the mobile terminal 102. The operation unit 304 is, to be specific, a static touch panel or the like in the case where the mobile terminal 102 is a smartphone.

The display unit 305 is a liquid crystal display or the like for performing display operation of the mobile terminal 102.

The system memory 306 is a memory for storing, for example, information received from the server 101, information received from the home appliance 103, and information for transmitting to the home appliance 103.

In the system memory 306 of the mobile terminal 102, at least shortcut information 306a and a command memory 306b are stored. The shortcut information 306a is information which is associated with an icon that is displayed on the display unit 305 and is for operating a home appliance (hereinafter also referred to as an association information item), and manages identification information of the home appliance to be operated and identification information of the shortcut.

In the command memory 306b, a command for operating the home appliance 103 is stored in association with the shortcut identification information.

The short distance wireless communication unit 307 is a communication control unit for communicating with the home appliance 103, and performs control on the communication using NFC, Bluetooth (registered trademark), or Wi-Fi.

The antenna 308 transmits and receives data to and from the antenna 201a of the home appliance 103 via the short distance wireless communication.

Figure 4:
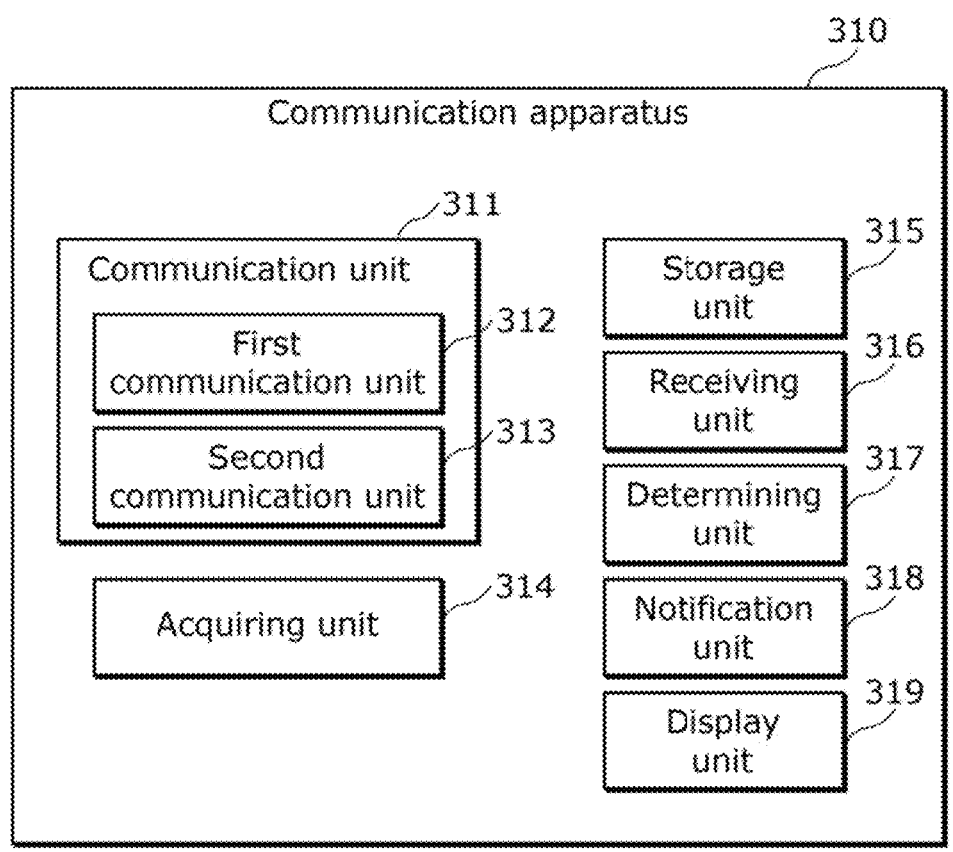
FIG. 4 is a block diagram illustrating a functional configuration related to communication processing of a communication apparatus 310.

FIG. 4 is a block diagram illustrating a functional configuration related to communication processing of the communication apparatus 310. More specifically, FIG. 4 is a block diagram illustrating a configuration of a function mainly related to communication processing of the communication apparatus according to the present embodiment, among functions of the mobile terminal 102 exerted by the hardware configuration illustrated in FIG. 3.

The communication apparatus 310 functionally includes: a communication unit 311; an acquiring unit 314; a storage unit 315; a receiving unit 316; a determining unit 317; a notification unit 318; and a display unit 319.

The communication unit 311 is capable of communicating with the home appliance 103 as an electrical appliance, and is also capable of communicating with the server 101 via the Internet. The communication unit 311 includes a first communication unit 312 and a second communication unit 313.

The first communication unit 312 is implemented by the antenna 308, the short distance wireless communication unit 307, and the like illustrated in FIG. 3. The communication unit 312 is capable of communicating with the home appliance 103 without involving the Internet. The first communication unit 312 in the communication unit 311, when it is determined by the determining unit 317 that a predetermined operation according to a command associated with an association information item received by the receiving unit 316 can be performed by the home appliance 103, transmits the command to the home appliance 103.

The second communication unit 313 is implemented by the antenna 301, the high speed wireless communication unit 302, and the like illustrated in FIG. 3. The second communication unit 313 is capable of communicating with the server 101 or the home appliance 103 via the Internet by connecting to the Internet using the communication network of the mobile phone. It is to be noted that the second communication unit 313 may be implemented by the antenna 308 and the short distance wireless communication unit 307 illustrated in FIG. 3, and may be connected to the Internet via an access point using, for example, Wi-Fi, Bluetooth (registered trademark), or the like.

The acquiring unit 314 is a processing unit implemented by the system controller 303, a nonillustrated program stored in the system memory 306, or the like. The acquiring unit 314 acquires, from the server 101, a command for causing the home appliance 103 to perform a predetermined operation, via the communication unit 311.

The storage unit 315 is implemented by the system memory 306 illustrated in FIG. 3. The storage unit 315 stores the command acquired by the acquiring unit 314 and the association information item which is associated with the command.

The display unit 319 is implemented by the display unit 305 illustrated in FIG. 3. The display unit 319 displays one or more association information items (icon) stored in the storage unit 315.

The receiving unit 316 is implemented by the operation unit 304 or the like illustrated in FIG. 3. The receiving unit 316 receives an operation of selecting one of the association information items (icon) among the one or more association information items (icon) displayed on the display unit 319.

The determining unit 317 is a processing unit implemented by the system controller 303 illustrated in FIG. 3, a nonillustrated program stored in the system memory 306, or the like. The determining unit 317 determines whether or not the home appliance 103 is capable of performing a predetermined operation according to the command associated with the one of association information items (icon) received by the receiving unit 316.

It is to be noted that a command may include a predetermined operation to be performed by the home appliance 103 and time information related to a start time for starting the performing of the predetermined operation. Subsequently, the determining unit 317, may determine that the home appliance 103 is capable of performing the predetermined operation when the current time is not past the start time acquired from the time information, and may determine that the home appliance 103 is not capable of performing the predetermined operation when the current time is past the start time. It is to be noted that, in this case, the time information may be information indicating the start time itself, or may be information indicating a combination of an end time and a time period taken for the operation. In other words, when the time information is the latter information indicating the combination, the start time is a time calculated from the end time and the time period taken for the operation.

In addition, the acquiring unit 314 may acquire a current season or weather information via the communication unit 311. In this case, the determining unit 317 may perform the determination according to whether or not the current season or the weather information satisfies the condition for the home appliance 103 to perform the predetermined operation. The determining unit 317, specifically, may perform the determination in the case where the home appliance 103 is an air conditioning device such as an air conditioner, a heating appliance, a humidifier, a dehumidifier, and the like. As to the air conditioner, for example, operation modes such as a cooling operation and a heating operation may be preliminarily associated one-by-one with each of the seasons or a plurality of temperature ranges, and the determining unit 317 may determine whether or not the operation mode indicated by the command is appropriate. As to the humidifier or the dehumidifier, for example, whether or not the humidifier or the dehumidifier is appropriate may be preliminarily associated one-by-one with each of the seasons or a plurality of temperature ranges, and the determining unit 317 may determine whether or not the operation mode indicated by the command is appropriate.

In addition, the acquiring unit 314 may further acquire the location at which the home appliance 103 is placed, and also the weather information of an area including the location, via the communication unit 311. In this case, the determining unit 317 may perform the determination according to whether or not the weather information satisfies the condition for the home appliance 103 to perform the predetermined operation. In other words, the determining unit 317 may perform the above-described determination using the weather information of the area the home appliance 103 is placed.

In addition, the acquiring unit 314 may further acquire an operation state of the home appliance 103 via the communication unit 311. In this case, the determining unit 317 may determine that the home appliance 103 is capable of performing the predetermined operation when the operation state of the home appliance 103 acquired by the acquiring unit indicates that the home appliance 103 is not in operation, and may determine that the home appliance 103 is incapable of performing the predetermined operation when the operation state indicates that the home appliance 103 is in operation.

The notification unit 318 is a processing unit implemented by the system controller 303 illustrated in FIG. 3, a nonillustrated program stored in the system memory 306, or the like. When it is determined, by the determination unit 317, that the home appliance 103 is incapable of performing the predetermined operation according to the command associated with the one of association information items (icon) received by the receiving unit 316, the notification unit 318 issues a notification indicating that the home appliance 103 is incapable of performing the predetermined operation. In addition, the notification unit 318, in this case, may issue a notification including the reason why the home appliance 103 is incapable of performing the predetermined operation, as the notification. In addition, the acquiring unit 314, in this case, may acquire a command that satisfies the condition for the home appliance 103 to be capable of performing the predetermined operation, from the server 101 via the communication unit 311.

Figure 5:
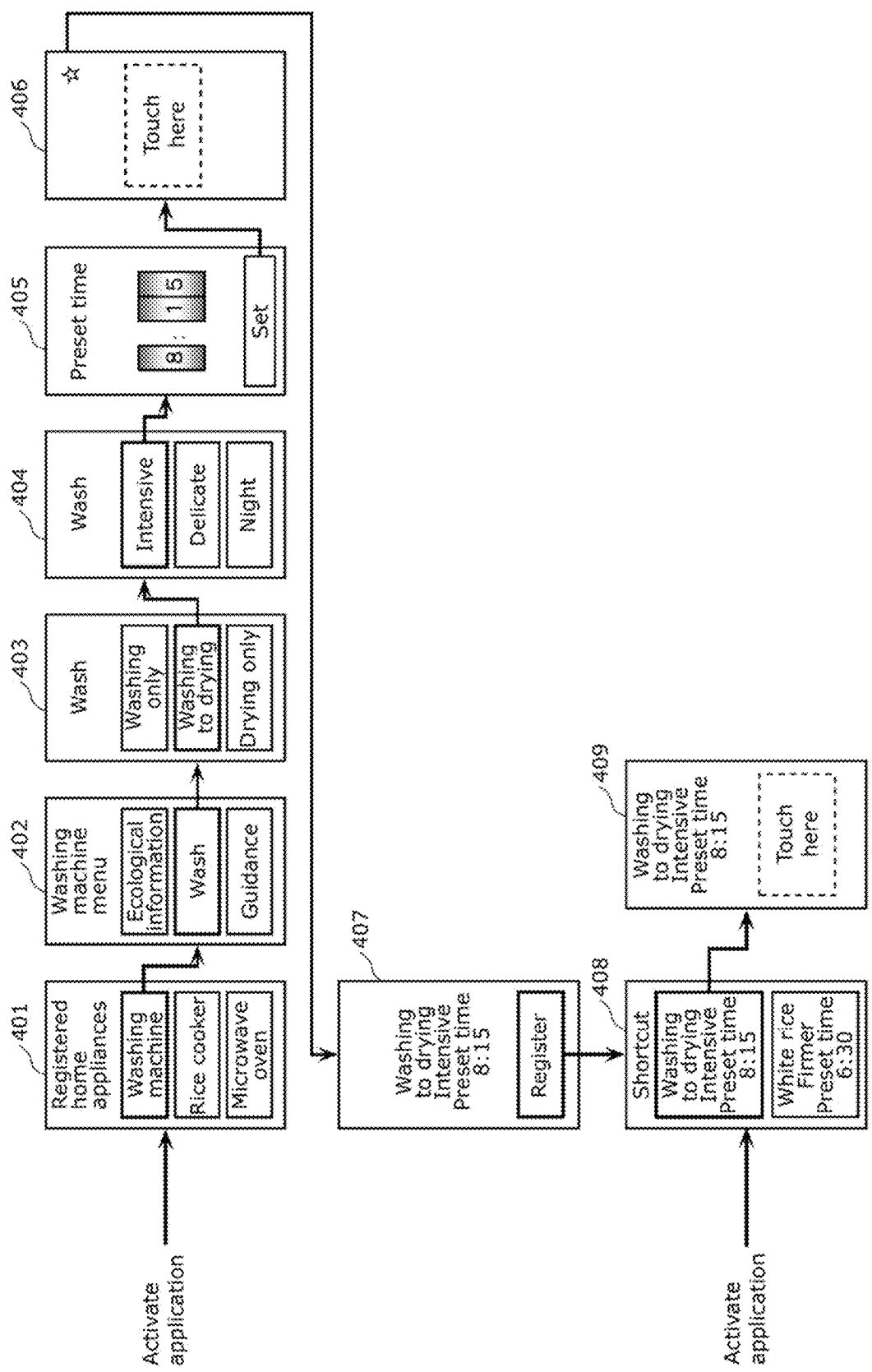
FIG. 5 is a flow diagram of an image screen illustrating the state when operating the home appliance 103 by the communication system 1.

FIG. 5 is a flow diagram of an image screen illustrating the state when operating the home appliance 103 by the communication system 1.

First, when a user activates the application installed on the mobile terminal 102, login authentication for the user is performed between the mobile terminal 102 and the server 101. Then, the mobile terminal 102 acquires information of a list of home appliances registered by the user who has been authorized to log in, and displays a screen image 401 showing the information of the list on the display unit 305. Here, the user is allowed to select a home appliance to be operated from the list of home appliances which is displayed.

When the user selects a home appliance to be operated, the mobile terminal 102 displays, on the display unit 305, a screen image 402 showing an operation menu set for each of the home appliances. In this example, a washing machine is selected on the screen image 401, and "to wash" is selected as an operation.

Next, the mobile terminal 102 presents detailed settings for the case of "to wash".

More specifically, the mobile terminal 102 displays, on the display unit 305, a screen image 403 showing a selection menu of courses of washing only, washing to drying, and drying only. In the case where the user selects "washing to drying", the mobile terminal 102 displays a screen image 404 showing modes of washing and drying on the display unit 305.

When "intensive" of the modes of washing and drying is selected on the screen image 404, the mobile terminal 102 displays a screen image 405 for setting a preset time on the display unit 305. According to the information inputted by the user during the transition of the screen images 401 to 405, details of the operation that the user wishes to cause the home appliance 103 to operate are defined.

Subsequent to the setting of a preset time, the mobile terminal 102 displays, on the display unit 305, a screen image 406 for notifying the message "touch here" for actually transmitting a command to the home appliance 103. While the screen image 406 is displayed, the mobile terminal 102 requests, to the server, for a command for performing a predetermined operation that is a combination of a plurality of operation conditions "washing to drying, intensive mode, preset time 8:15" defined according to the inputs by the user, and receives from the server 101 the command which is encrypted. Subsequently, in response to the user's operation of touching or approximating the mobile terminal 102 to the home appliance 103, the mobile terminal 102 transmits, using the short distance wireless communication (the communication using NFC, in this case), the command received from the server 101 to the home appliance 103, thereby causing the home appliance 103 to operate.

However, performing such operations following the screen image flow illustrated in the screen images 401 to 406 every time the home appliance is operated leads to imposing burden on the user. Generally, in the case of a home appliance such as a washing machine, a rice cooker, or the like, a uniform operation is performed based on the life rhythm of a user in most cases. Accordingly, it is bothersome for the user to do the selecting operation every time for each item following the screen image flow.

In view of the above, the communication system 1 is capable of registering a once-selected operation performed on a home appliance as a shortcut. By the time the screen image 406 is displayed, an encrypted command for operating a home appliance is already received by the mobile terminal 102 from the server 101. Accordingly, by registering the operation as a shortcut, the user is not required to perform the selecting operation every time for each of the items, and thus it is possible to easily operate the home appliance. In addition, since the encrypted command is already received from the server 101, it is possible, by holding the command in the mobile terminal 102, to reduce communications with the server 101 in subsequent operations for the home appliance 103 using the same command, thereby allowing a user to quickly operate the home appliance 103.

Subsequent to the short distance wireless communication performed between the mobile terminal 102 and the home appliance 103 as a result of the user's operation of touching the mobile terminal 102 to the home appliance 103, the mobile terminal 102 displays a screen image 407 for registering a shortcut, on the display unit 305. On the screen image 407, the details set by the user on the screen images 402 to 405 are displayed for confirmation, and a button for registering a shortcut is displayed as well.

As a result of pressing a registration button on the screen image by the user, the details are added to a list showing registered shortcuts. Then, the mobile terminal 102 displays, on the display unit 305, a screen image 408 including an association information item as an icon for allowing the user to visually identify the command registered as a shortcut. Here, the association information item may be an icon indicated by a character, an icon indicated by an image, or may simply be a character string. In other words, the association information item only needs to be information associated with a predetermined operation which indicates a combination of a plurality of operation conditions.

In the state where a shortcut is registered on the mobile terminal 102, the screen image 408 showing a list of icons indicating shortcuts is displayed upon activation of the application. Accordingly, it is not required to acquire the list of the registered home appliance 103, and thus it is possible to reduce the number of times of communicating with the server 101, making it possible to implement a quick operation.

Subsequent to selecting an icon from the list of a plurality of icons indicating shortcuts displayed on the screen image 408, a screen image 409 is displayed on the display unit 305. When an icon is selected from the list of a plurality of icons indicating shortcuts, the mobile terminal 102 displays the screen image 409 on the display unit 305 for showing the details of a predetermined operation which include a combination of a plurality of operation conditions and for prompting the user to touch or approximate the mobile terminal 102 to the home appliance 103. As a result of touching or approximating the mobile terminal 102 to the home appliance 103 while the screen image 409 is displayed, the mobile terminal 102 transmits the command held in the mobile terminal 102 to the home appliance 103. With this, it is possible to implement the screen image flow of the screen images 401 to 406 with one tap or one touch operation on the screen images 408 and 409 when the shortcut indicating the operation once performed by the user on the home appliance 103 using the mobile terminal 102 is registered on the mobile terminal 102, allowing deftly operating the home appliance 103 using the mobile terminal 102.

Figure 6:
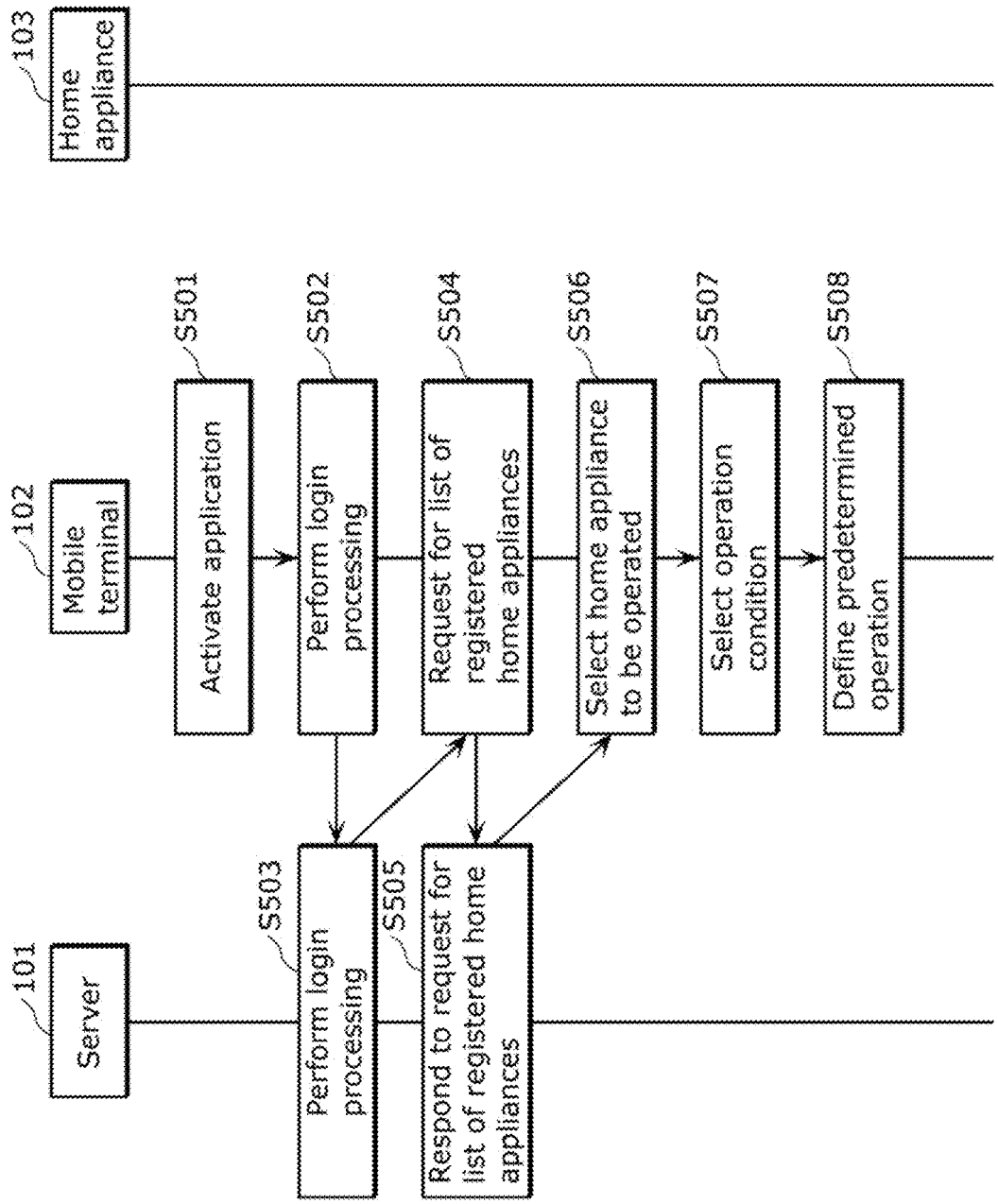
FIG. 6 is a sequence diagram illustrating processes carried out by the communication system 1 when a home appliance is operated according to screen images 401 to 406.

FIG. 6 is a sequence diagram illustrating the processes performed by the communication system 1 when operating a home appliance 103 using the screen images 401 to 406.

First, the mobile terminal 102 activates an application for operating the home appliance 103 (S501). More specifically, the mobile terminal 102 activates an application in response to an input by a user which is received by the receiving unit 316.

Upon activating the application, the mobile terminal 102 performs login processing to the server 101 (S502). The login processing is, to be specific, processing of performing user authentication by transmitting to the server an ID and a password of the user which the receiving unit 316 has received from the user.

When it is determined that the ID and the password transmitted from the mobile terminal 102 is valid, the server 101 outputs session management information to the mobile terminal 102, and completes the login processing (S503). More specifically, by comparing the combination of an ID and a password preliminarily registered and the combination of the ID and the password transmitted by the mobile terminal 102, for example, the server 101 determines that the ID and the password transmitted by the mobile terminal 102 is valid when there is an ID and a password that match among the IDs and the passwords preliminarily registered. When it is determined that the ID and the password transmitted by the mobile terminal 102 are not registered, the server 101 determines that the ID and password are invalid.

When login with the ID and the password is authorized, the mobile terminal 102 requests for the list of registered home appliances to the server 101 (S504). To be specific, the mobile terminal 102 transmits a registered-home-appliance-list request to the server 101.

When the registered-home-appliance-list request transmitted by the mobile terminal 102 is received, the server 101 transmits to the mobile terminal 102 the list of registered home appliances associated with the user who is logged in, thereby responding to the request for the list. Upon receiving the list of registered home appliances, the mobile terminal 102 generates the screen image 401, displays the generated screen image 401 on the display unit 305, and waits until an input indicating selection of a home appliance to be operated is provided by the user.

Next, when the input performed by the user indicating selection of the home appliance to be operated is received by the operation unit 304 (S506), the mobile terminal 102 sequentially presents the screen images 402 to 405 to prompt the user to select an operation condition for each of the screen images 402 to 405 (S507). Subsequent to the receiving of the selection for all the operation conditions in Step S507, the mobile terminal 102 generates the screen image 406 and also defines a predetermined operation which is a combination of a plurality of operation conditions (S508).

Figure 7:
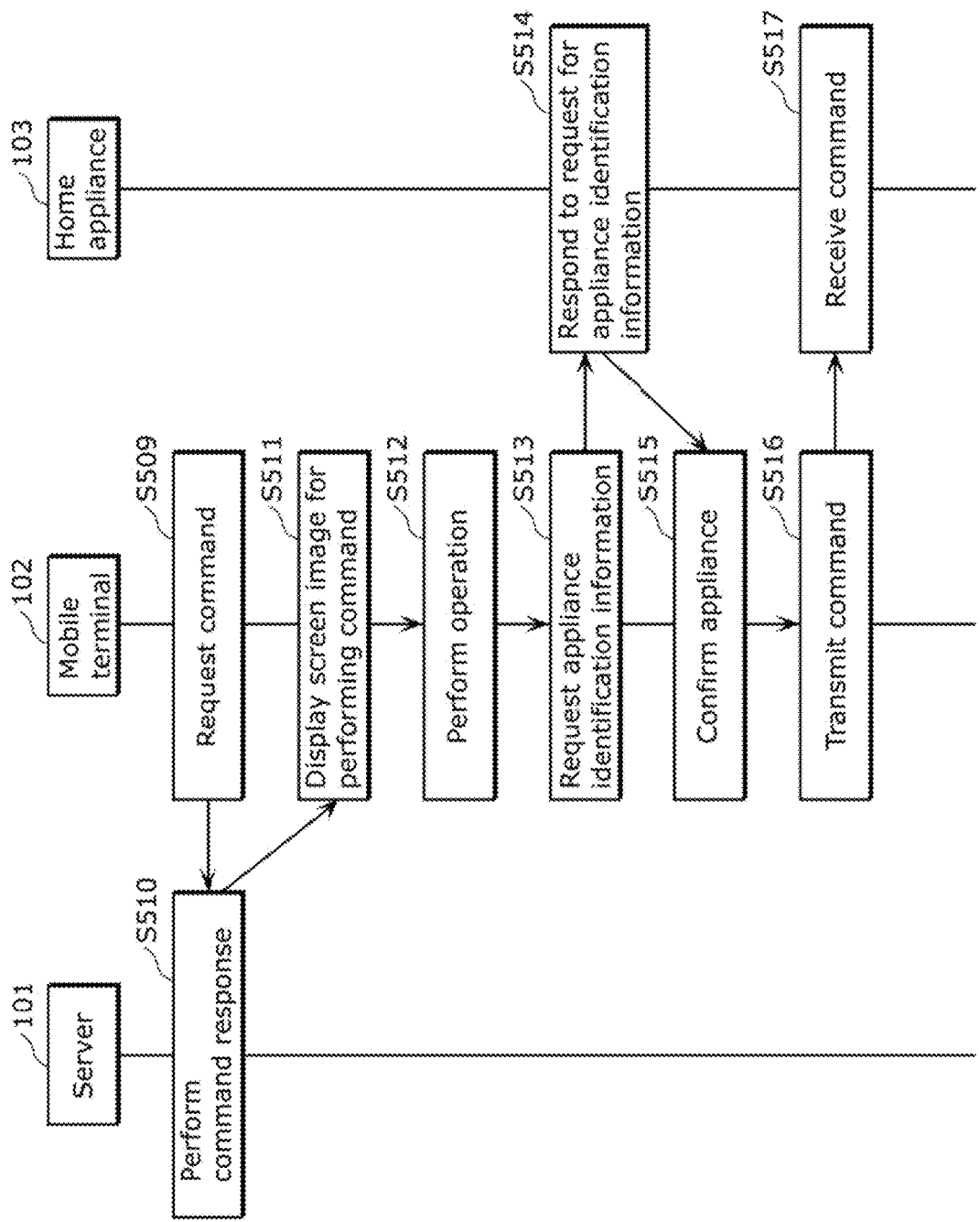
FIG. 7 is a sequence diagram illustrating an example of processes carried out by the communication system 1 before a command is transmitted to the home appliance in the screen image 406 illustrated in FIG. 5.

FIG. 7 is a sequence diagram illustrating an example of the processes carried out by the communication system 1 before a command is transmitted to the home appliance 103 on the screen image 406 illustrated in FIG. 5.

First, the mobile terminal 102 requests the server 101 to transmit a command for performing the predetermined operation defined in Step S508 (S509). More specifically, the mobile terminal 102 requests the server 101 to transmit a command for performing the predetermined operation, by transmitting a command request to the server 101.

When the command request is received from the mobile terminal 102, the server 101 generates a command corresponding to the command request, and also encrypts the generated command. Then, the server 101 transmits the encrypted command to the mobile terminal 102, thereby performing a command response (S510).

When the encrypted command is received from the server 101, the mobile terminal 102 displays, on the display unit 305, a screen image for prompting the user to perform an operation for causing the home appliance 103 to perform the command (S511). More specifically, when the command is received from the server 101, for example, the mobile terminal 102 may display the screen image 406 on the display unit 305 to prompt the user to touch or approximate the mobile terminal 102 to the home appliance 103. In addition, for example, when the command is transmitted to the home appliance 103 using Wi-Fi, Bluetooth (registered trademark), the communication network for mobile phones, or the like, the mobile terminal 102 may issue, to the user, a notification prompting the user to perform an operation to transmit the command. Subsequent to the generating of the screen image 406 indicating the notification, the mobile terminal 102 waits until the operation to transmit the command is performed by the user.

Next, when the operation to transmit the command is performed by the user (S512), the mobile terminal 102 requests the home appliance 103 to transmit appliance identification information (S513). To be specific, the mobile terminal 102 requests the home appliance 103 to transmit appliance identification information by transmitting an appliance-identification-information request to the home appliance 103.

When the appliance-identification-information request is received from the mobile terminal 102, the home appliance 103 transmits to the mobile terminal 102 appliance identification information of the home appliance 103 stored in the communication memory 204, thereby performing an appliance identification information response (S514).

Next, when the appliance identification information is received from the home appliance 103, the mobile terminal 102 confirms whether the home appliance 103 is a home appliance to be operated, based on the appliance identification information which has been received (S515).

When it is confirmed that the home appliance 103 is a home appliance to be operated, the mobile terminal 102 transmits to the home appliance 103 the encrypted command received from the server 101 (S516).

The home appliance 103 starts a predetermined operation according to the received command (S517).

It is to be noted that, when it is determined by the mobile terminal 102 that the home appliance 103 is not a home appliance to be operated in Step S515, the mobile terminal 102 presents an error screen image displaying that effect, in order to disable transmission of the encrypted command.

Figure 8:
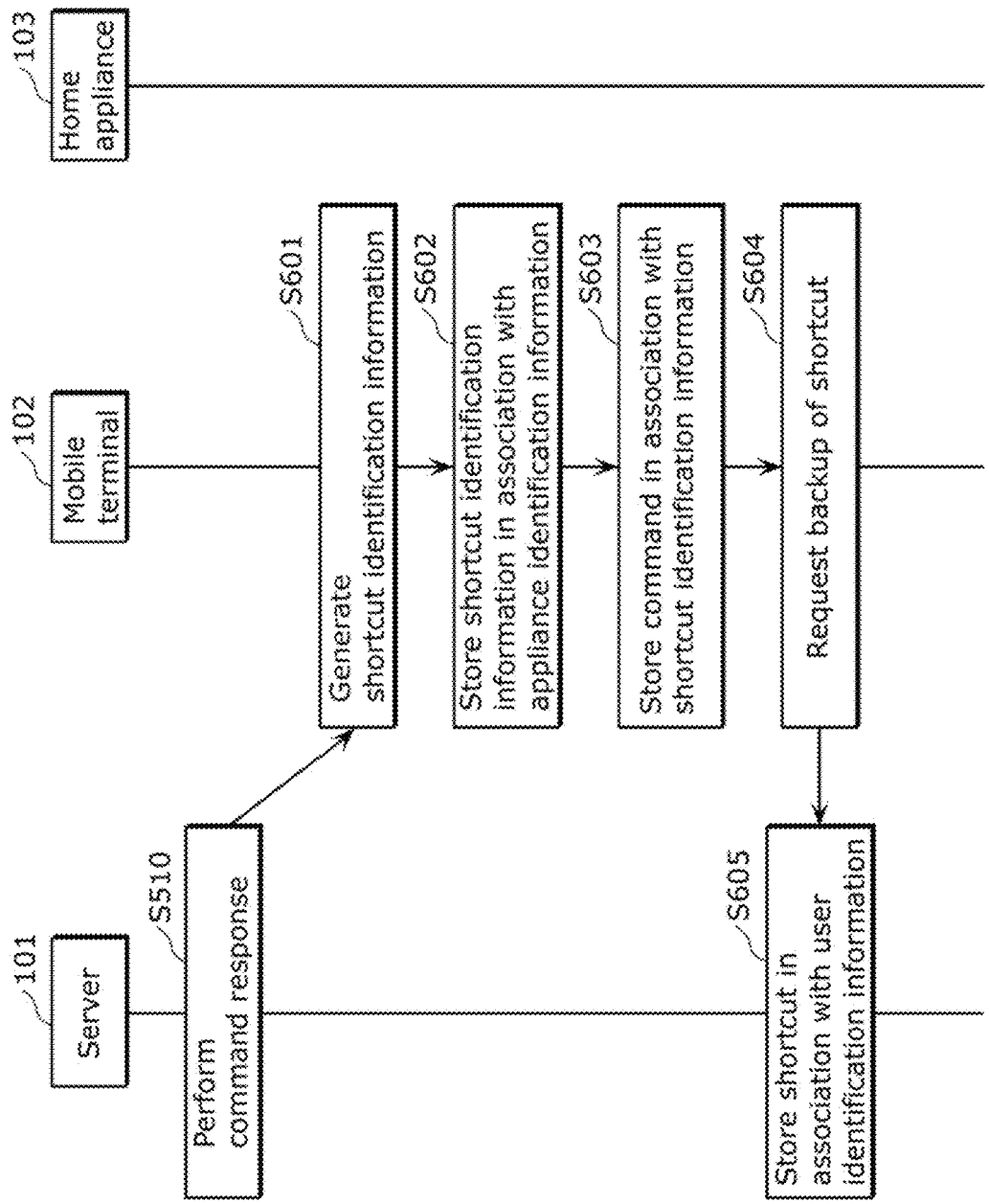
FIG. 8 is a sequence diagram illustrating processes for registering a shortcut in the screen images 407 and 408 illustrated in FIG. 5.

FIG. 8 is a sequence diagram illustrating processes for registering a shortcut in the screen images 407 and 408 illustrated in FIG. 5.

When the encrypted command generated by the server 101 is received in Step S510, the mobile terminal 102 generates shortcut identification information (S601). The shortcut identification information is identification information determined uniquely for each shortcut.

Subsequent to the generation of the shortcut identification information, the mobile terminal 102 stores in the system memory 306 the shortcut identification information as shortcut information 306*a*, in association with the appliance identification information acquired in Step S515 (S602).

In addition, the mobile terminal 102 stores, in the command memory 306*b* of the system memory 306, the encrypted command received from the server 101, in association with the generated shortcut identification information (S603).

As described above, the shortcuts are each stored in the system memory 306 of the mobile terminal 102 in association with the appliance identification information and the command using the shortcut identification information as a key. With this, the mobile terminal 102 is capable of using the command once generated by the server 101 without communicating with the server 101. In addition, the command is stored as being encrypted in the mobile terminal 102. Thus, it is possible to prevent leakage of generating method of the command to a malicious person, even if the application of the mobile terminal 102 is cryptanalyzed. In addition, it is possible to safely manage the command even if the command is stored in the mobile terminal 102.

In addition, every time a shortcut is generated, in other words, when a change is made to the shortcut information stored in the mobile terminal 102 (specifically, after Step S603 is performed), the mobile terminal 102 issues a request to the server 101 for backup of the shortcut information and the command information in the system memory on the server 101 (S604). To be specific, the mobile terminal 102 transmits the shortcut information that has been changed to the server 101.

The server 101 receives the shortcut information that has been changed and stores the received shortcut information in association with the user's identification information, thereby making backup of the shortcut information (S605). It is to be noted that, in Step S604, when the shortcut information is changed, only the difference from the shortcut information before the change may be transmitted to the server 101, or the changed shortcut information as a whole may be transmitted to the server 101.

As described above, by storing the shortcut information in the server 101, it is possible to easily restore the generated shortcut information even when the mobile terminal 102 which the user uses is changed to a new terminal due to breakdown, model change, or the like.

Accordingly, when it is determined that the shortcut information corresponding to the logged-in user is not managed by the system memory 306 of the mobile terminal 102, the mobile terminal 102 may request the server 101 to transmit the shortcut information which is backed up and generate the screen image 408 indicating a list of shortcuts based on the received shortcut information.

Figure 9:
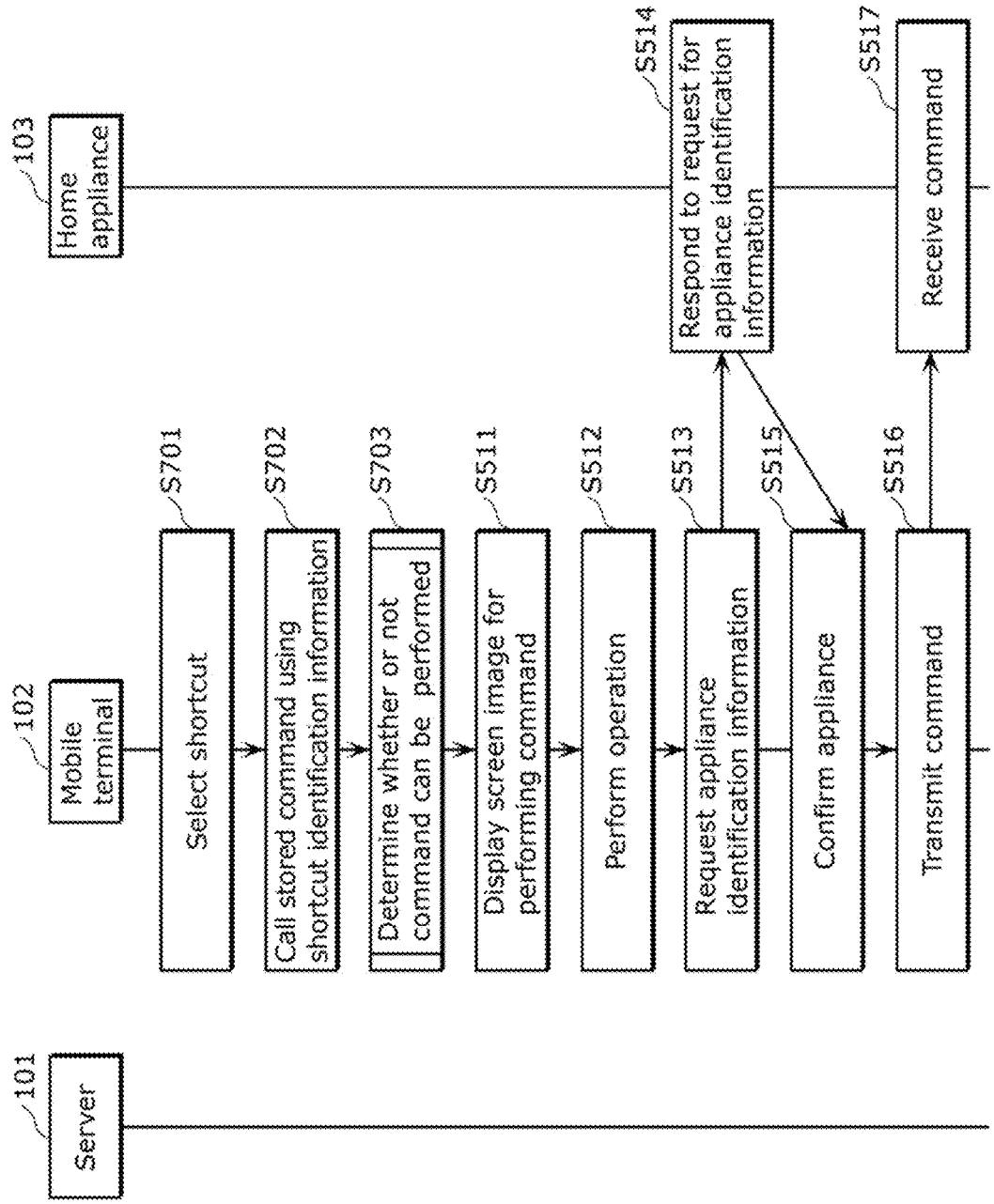
FIG. 9 is a sequence diagram illustrating processes for operating the home appliance using a list of the shortcuts in the screen images 408 and 409 illustrated in FIG. 5.

FIG. 9 is a sequence diagram illustrating processes for operating the home appliance 103 using the list of the shortcuts in the screen images 408 and 409 illustrated in FIG. 5.

Upon activating the application, the mobile terminal 102 displays, on the display unit 305, the screen image 408 indicating the list of shortcuts in the case where the shortcuts are registered, and waits until the user selects one icon from among a plurality of icons indicating the list of shortcuts.

Next, when the user's input indicating selecting of one icon is received by the operation unit 304 (S701), the mobile terminal 102 checks the shortcut identification information associated with the icon, and calls a command stored in association with the shortcut identification information from the command memory 306*b* of the system memory 306 (S702).

Then, the mobile terminal 102 determines whether or not the home appliance 103 is capable of performing a predetermined operation according to the called command (S703). The details of determination in Step S703 will be described later.

When it is determined that the home appliance 103 is capable of performing the predetermined operation in Step S703, the mobile terminal 102 performs the processes of Step S511 to Step S517 explained in FIG. 7.

Figure 10:
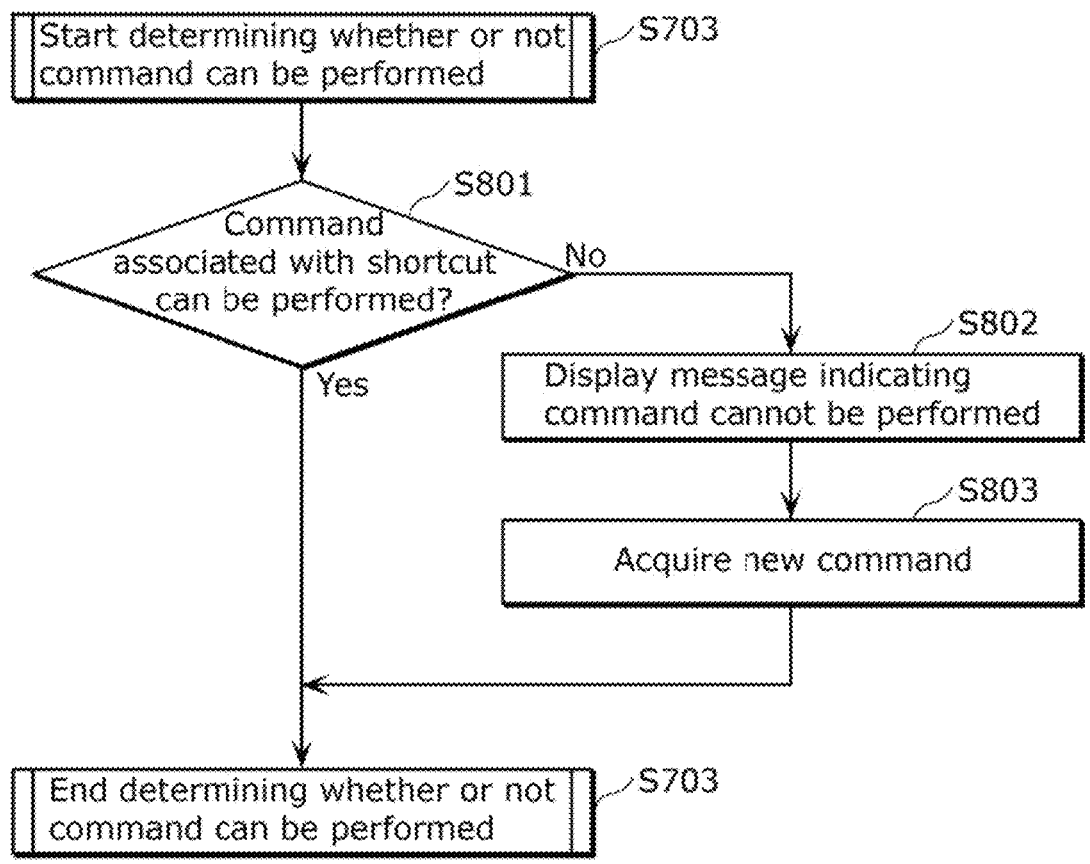
FIG. 10 is a flowchart illustrating determination processing of Step S703.

FIG. 10 is a flowchart illustrating the determination processing of Step S703.

First, the mobile terminal 102 determines whether or not the home appliance 103 is capable of performing the command associated with the icon indicating the shortcut (S801). To be specific, the determining unit 317 of the communication apparatus 310 included in the mobile terminal 102 performs the determination illustrated in FIG. 4.

When it is determined that the home appliance 103 is capable of performing the command associated with the icon indicating the shortcut (S801: Yes), the mobile terminal 102 ends the determination process in Step S703 and proceeds to Step S511.

On the other hand, when it is determined that the home appliance 103 is incapable of performing the command associated with the icon indicating the shortcut (S801: No), the mobile terminal 102 displays on the display unit 305 a message indicating that the home appliance 103 is incapable of performing the command (S802).

Then, the mobile terminal 102 requests, to the server 101, for a new command for performing a new predetermined operation which satisfies the condition for the home appliance 103 to be able to perform the operation, and acquires the new command from the server 101 (S803). In this case, the mobile terminal 102 may notify, in Step S802, the user of a message indicating the reason why the home appliance 103 is incapable of performing the command, thereby prompting the user to perform input for defining a predetermined operation from which the reason why the command cannot be performed is excluded. In addition, the mobile terminal 102 may automatically generate a new predetermined operation which satisfies the condition for the home appliance 103 to be able to perform the operation.

FIG. 11 is a table illustrating the shortcut information.

As illustrated in FIG. 11, the shortcut information includes a shortcut ID, home appliance identification information, an icon URL, and pointer information for a command.

The shortcut ID is shortcut identification information and an ID which uniquely determines a shortcut.

The home appliance identification information determines a home appliance to be operated, and may be unique information for each home appliance, or may be information such as a model number. In addition, when the home appliance identification information is unique information of the home appliance, it is possible to limit a home appliance to be operated, even when the model numbers of the home appliances are the same. Furthermore, when the home appliance identification information is the information of a model number, a plurality of home appliances which are the same model may be allowed to be operated according to a common command. The appliance identification information is information acquired by the mobile terminal 102 from the server 101 when requesting for the registered list of home appliances in Step S504. The source information of the home appliance identification information registered on the server 101 is the appliance identification information stored in the communication memory 204 of the home appliance 103.

The icon URL is a URL of an icon used for a shortcut icon. It is desirable to change the icon for each command in terms of increasing the visibility for a user. In the case of a washing machine, for example, it is desirable to change the character, design, or pattern of the icon according to the details of the preset time or course setting.

The pointer to a command is a pointer to a stored memory of a home appliance operation command corresponding to the shortcut. With this, it is possible to uniquely determine a home appliance operation command as a result of selecting an icon of the shortcut.

As described above, with the communication method and the communication apparatus according to the present disclosure, it is possible to register, as a shortcut, favorites of a user or a commonly-used menu.

The shortcut also includes the encrypted command generated by the server 101. As described above, even in the case where a command is allowed to be generated only in the server 101 for the purpose of a secure implementation, the mobile terminal 102 is capable of storing the encrypted command in the mobile terminal 102 and thus it is possible to reduce communications with the server 101.

In addition, by changing the pattern of the icon indicating the shortcut for each command, it is possible to improve the visibility for the user and thus improve usability.

In addition, for the data which does not require a communication with the server 101, when operating the home appliance 103 using a registered shortcut, a preset time, for example, is allowed to be changed immediately before touching or approximating the mobile terminal 102 to the home appliance 103 ("touch here" in the screen image 409), thereby further improving the usability. In this case, the preset time is not required to be included as a command, and the command may cause the home appliance 103 to perform the combination of a plurality of operation conditions set by the user other than the preset time. This eliminates the need for taking trouble of registering a plurality of shortcuts in which only the preset times are different. Needless to say, when the preset time is included in the command, the mobile terminal 102 causes the server 101 to generate a command corresponding to the changed preset time and acquires the command.

It is to be noted that the shortcut information managed by the mobile terminal 102 may be managed for each user. More specifically, by managing the shortcut information in association with the user identification information for each user who logs in, it is possible to present the shortcut information for each user even in the case where the mobile terminal 102 is used by a plurality of members in a family, such as the case of a tablet terminal.

In addition, although only the case where the shortcut is registered by a user has been described, the shortcut may be implemented as a shortcut which is automatically added by registration of the home appliance 103. In this case, a list of shortcuts to be added is preliminarily generated in the server 101 for each item number of a home appliance, and thus it is possible to use the shortcuts for the purpose of advertising functions that a home appliance manufacturer wishes a user to use, by adding the list as a default shortcut every time the home appliance is added.

It is to be noted that the convenience is further improved by preparing a shortcut related to display or guidance, as the function of a shortcut, in addition to the shortcut for operating the home appliance. For example, it is possible to display an instruction manual for the appliance, display data measured by a health-care appliance in a graph form, or activate a different application, by only pressing an icon of the corresponding shortcut.

In addition, it is desirable to manage backup of a shortcut to a server with a time stamp being attached. For example, it is possible to always back up a shortcut as a latest shortcut even when two mobile terminals 102 are used at the same time, and also possible to eliminate discrepancy by confirming time stamp information even in the case where shortcut information is updated without communication with the server.

Other Embodiments

It is to be noted that the communication apparatus 310 according to the above-described embodiment may be implemented by downloading and installing a program for performing the communication method according to the above-described embodiment from an external server to the mobile terminal 102.

Figure 12:
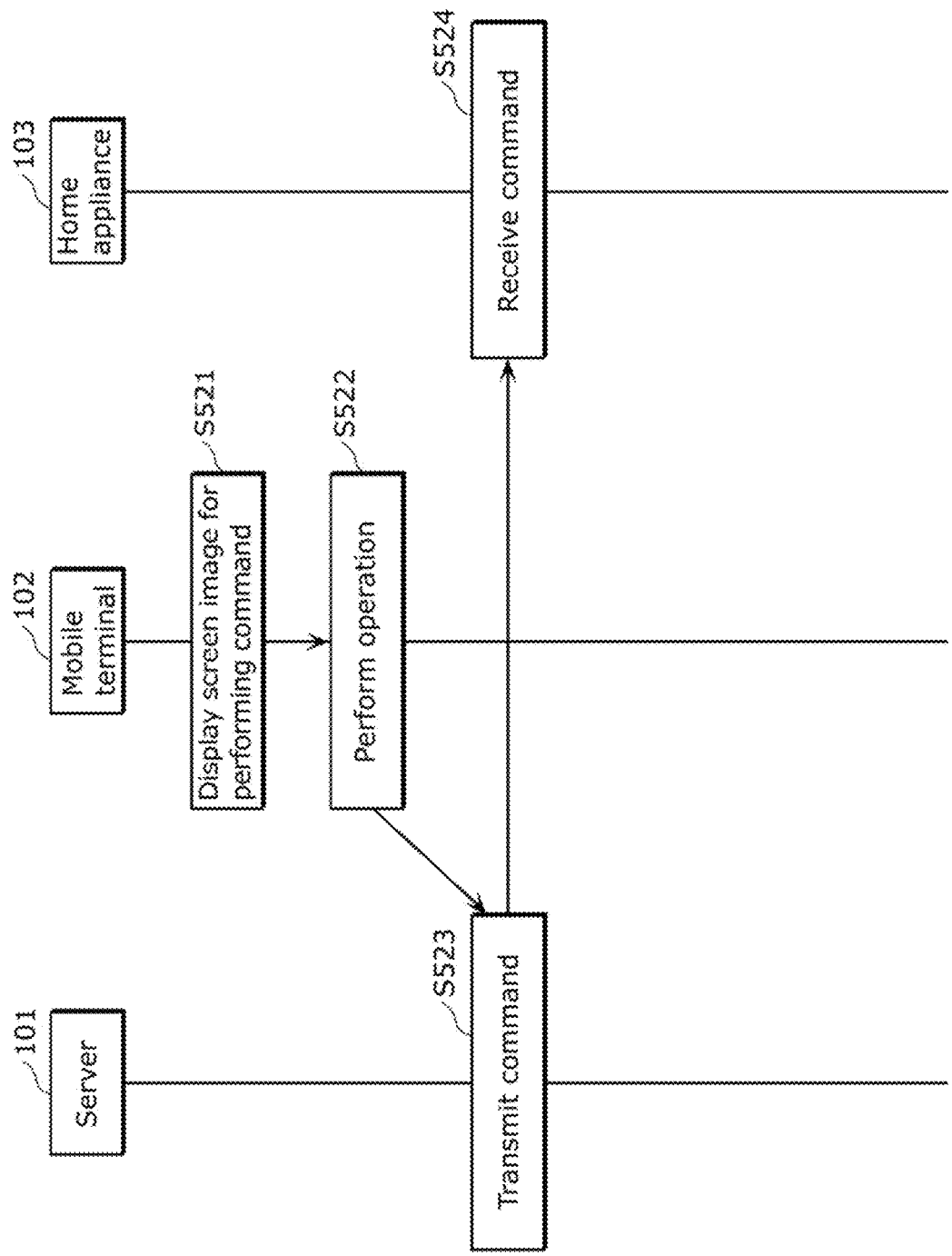
FIG. 12 is a sequence diagram illustrating another example of processes carried out by the communication system 1 before a command is transmitted to the home appliance in the screen image 406.

It is to be noted that, although an example has been described in which the mobile terminal 102 receives a command from the server 101 and transmits the received command to the home appliance 103 in FIG. 7, the processing is not limited to this. For example, as illustrated in FIG. 12, when a command request is received from the mobile terminal 102, the server 101 may transmit a command generated in response to the command request to the home appliance 103 without involving the mobile terminal 102. It is to be noted that the communication system 1 may determine whether to perform the processes described in FIG. 7 or to perform the processes described in FIG. 12, based on information preliminarily set by a user, or may determine a communication path that is available at the time between the mobile terminal 102 and the home appliance 103.

FIG. 12 is a sequence diagram illustrating another example of the processes carried out by the communication system 1 before a command is transmitted to the home appliance 103 in the screen image 406.

First, when a predetermined operation is defined in Step S508, the mobile terminal 102 displays, on the display unit 305, a screen image prompting a user to perform an operation for causing the home appliance 103 to perform the predetermined operation that has been defined (S521). Subsequent to the generating of the above-described screen image, the mobile terminal 102 waits until the user performs the operation for causing the server 101 to transmit a command to the home appliance 103.

Next, when the user performs the operation for causing the server 101 to transmit the command to the home appliance 103 (S522), the mobile terminal 102 causes the server 101 to generate a command corresponding to the predetermined operation that has been defined in Step S508 and encrypts the generated command. Then, the server 101 transmits the encrypted command to the home appliance 103 (S523).

The home appliance 103 starts the predetermined operation according to the received command (S524).

It is to be noted that, in the processes illustrated in FIG. 8, processes corresponding to Step S513 to Step S515 performed between the mobile terminal 102 and the home appliance 103 in FIG. 7 may be performed between the server 101 and the home appliance 103 prior to transmitting the command to the home appliance 103.

Figure 13:
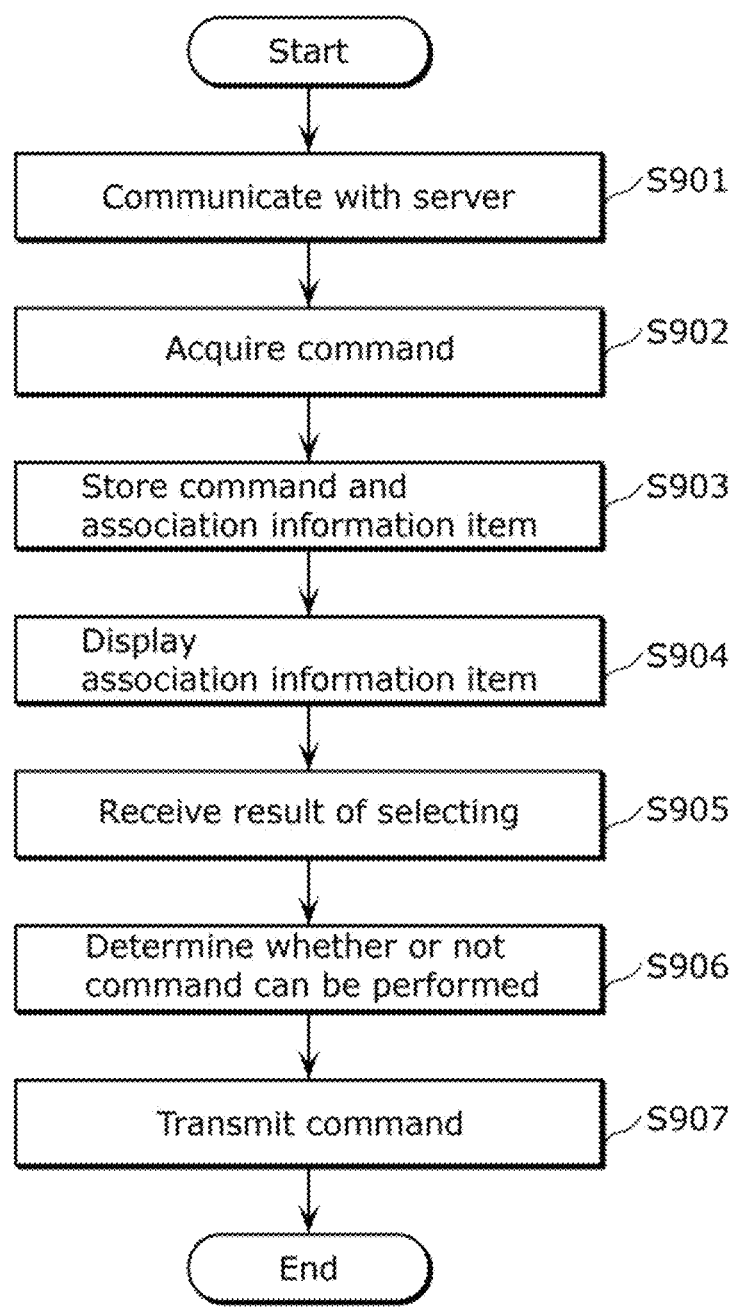
FIG. 13 is a flowchart illustrating a minimum configuration of a communication method.

In the communication method according to the embodiment performed by the communication apparatus 310 that is implemented by the mobile terminal 102, it is not required to perform all of the processes of FIG. 6 to FIG. 10, and it is sufficient to perform the processes of FIG. 13. FIG. 13 is a flowchart illustrating a minimum configuration of the communication method.

First, the mobile terminal 102 communicates with the server 101 via the Internet (S901: the first communication step).

A command for causing the home appliance 103 to perform a predetermined operation is acquired from the server 101 in the communication performed in the first communication step (S902: acquiring step).

The command acquired in the acquiring step and an association information item (icon) associated with the command are stored in the storage unit 315 (S903: storing step).

A plurality of the association information items (icon) stored in the storing step are displayed on the display unit 319 (S904: display step).

A selection of an association information item among the plurality of the association information items displayed in the display step is received (S905: receiving step).

Whether or not the home appliance 103 is capable of performing the predetermined operation according to the command associated with the association information item (icon) received in the receiving step is determined (S906: determining step).

When it is determined that the home appliance 103 is capable of performing the predetermined operation according to the command associated with the association information item received in the receiving step, the command is transmitted to the home appliance 103 (S907: the second communication step).

Each of the structural elements in each of the above-described embodiments may be configured in the form of an exclusive hardware product, or may be realized by executing a software program suitable for each of the structural elements. Each of the structural elements may be realized by means of a program executing unit, such as a CPU and a processor, reading and executing the software program recorded on a recording medium such as a hard disk or a semiconductor memory. Here, the software program for realizing the communication apparatus and the like according to each of the embodiments described above is a program as described below.

The program causes a computer to execute a communication method for operating an electrical appliance, the method including: performing communication with a server via the Internet, acquiring a command from the server in the communication performed in the performing of communication, the command being for causing the electrical appliance to perform a predetermined operation, storing in a storage unit the command acquired in the acquiring and an association information item associated with the command; displaying on a display unit a plurality of the association information items stored in the storing; receiving a selection of an association information item among the plurality of the association information items displayed in the displaying; determining whether or not the electrical appliance is capable of performing the predetermined operation according to the command associated with the association information item the selection of which is received in the receiving; and when it is determined that the electrical appliance is capable of performing the predetermined operation according to the command associated with the association information item the selection of which is received in the receiving, transmitting the command to the electrical appliance.

It should be noted that although the communication method and the communication apparatus according to one or more aspects have been described based on the aforementioned embodiments, the present disclosure is obviously not limited to such embodiments. Other forms in which various modifications apparent to those skilled in the art are applied to Embodiment, or forms structured by combining structural elements of different aspects of Embodiment may be included within the scope of the one or plurality of aspects, unless such changes and modifications depart from the scope of the present disclosure.

The communication method and the communication apparatus according to the present disclosure is useful as a communication method and a communication apparatus each of which is for operating a home appliance from a mobile terminal and is capable of alleviating the operational burden of a user and reducing power consumption.

The invention claimed is:

1. A communication method for operating an electrical appliance, the method comprising:
    performing communication with a server via the Internet;
    receiving, from a user, an input for causing the electrical appliance to perform a predetermined operation at a predetermined time;
    acquiring a command from the server in the communication performed in the performing of the communication, the command being for causing the electrical appliance to perform the predetermined operation at the predetermined time, according to the input received in the receiving of the input;
    storing, in a storage unit, the command acquired in the acquiring and a plurality of association information items, one association information item among the plurality of the association information items being associated with the command, the command including the predetermined operation to be performed by the electrical appliance and time information related to a start time for starting performing of the predetermined operation;
    displaying on a display unit the plurality of the association information items stored in the storing;
    receiving a selection of an association information item among the plurality of the association information items displayed in the displaying;
    requesting the electrical appliance to transmit appliance identification information;
    receiving, from the electrical appliance, the appliance identification information requested in the requesting;
    confirming whether the electrical appliance that transmitted the appliance identification information is an electrical appliance to be operated, based on the appliance identification information received in the receiving of the appliance identification information;
    determining that (i) when a current time is not past the start time acquired from the time information, the electrical appliance is capable of performing the predetermined operation according to the command associated with the one association information item, the selection of which is received in the receiving of the selection, and that (ii) when the current time is past the start time, the electrical appliance is incapable of performing the predetermined operation according to the command associated with the one association information item, the selection of which is received in the receiving of the selection; and
    when the electrical appliance is determined, in the determining, to be capable of performing the predetermined operation according to the command associated with the one association information item, the selection of which is received in the receiving of the selection, and when the electrical appliance is confirmed, in the confirming, to be the electrical appliance to be operated, transmitting the command acquired in the acquiring to the electrical appliance to cause the electrical appliance to perform the predetermined operation at the predetermined time.

2. The communication method according to claim 1, wherein in the acquiring, a current season or weather information is further acquired in the communication, and
    in the determining, the determining is performed according to whether or not the current season or the weather information satisfies a condition for the electrical appliance to perform the predetermined operation.

3. The communication method according to claim 2, wherein in the acquiring, a location at which the electrical appliance is placed is further acquired and the weather information of an area including the location is acquired in the communication, and
    in the determining, the determining is performed according to whether or not the weather information satisfies the condition.

4. The communication method according to claim 1, wherein in the acquiring, an operation state of the electrical appliance is further acquired in the communication, and
    in the determining,
    the electrical appliance is further determined to be capable of performing the predetermined operation when the operation state of the electrical appliance acquired in the acquiring indicates that the electrical appliance is not in operation, and
    the electrical appliance is further determined to be incapable of performing the predetermined operation when the operation state indicates that the electrical appliance is in operation.

5. The communication method according to claim 1, further comprising
    issuing a notification indicating that the electrical appliance is incapable of performing the predetermined operation, when, in the determining, the electrical appliance is determined to be incapable of performing the predetermined operation according to the command associated with the one association information item, the selection of which is received in the receiving of the selection.

6. The communication method according to claim 5, wherein in the issuing of the notification, a notification including a reason why the electrical appliance is incapable of performing the predetermined operation is issued as the notification.

7. The communication method according to claim 5, wherein in the acquiring, a command that satisfies a condition for the electrical appliance to be capable of performing the predetermined operation is acquired from the server in the communication.

8. A communication apparatus for operating an electrical appliance, the communication apparatus comprising:
    a communication unit configured to communicate with the electrical appliance, to communicate with a server via the Internet, to request the electrical appliance to transmit appliance identification information, and to receive the appliance identification information from the electrical appliance;
    an operation unit configured to receive an input from a user for causing the electrical appliance to perform a predetermined operation at a predetermined time;

an acquiring unit configured to acquire, from the server via the communication unit, a command for causing the electrical appliance to perform the predetermined operation at the predetermined time, according to the input received by the operation unit;

a storage unit configured to store the command acquired by the acquiring unit and a plurality of association information items, one association information item among the plurality of the association information items being associated with the command, the command including the predetermined operation to be performed by the electrical appliance and time information related to a start time for starting performing of the predetermined operation;

a display unit configured to display at least one of the plurality of the association information items stored in the storage unit;

a receiving unit configured to receive a selection of an association information item among the plurality of the association information items displayed on the display unit; and a determining unit configured to determine whether the electrical appliance that has transmitted the appliance identification information is an electrical appliance to be operated, based on the appliance identification information received by the communication unit and configured to determine that (i) when a current time is not past the start time acquired from the time information, the electrical appliance is capable of performing the predetermined operation according to the command associated with the one association information item, the selection of which is received in the receiving unit, and that (ii) when the current time is past the start time, the electrical appliance is incapable of performing the predetermined operation according to the command associated with the one association information item, the selection of which is received in the receiving unit, wherein the communication unit is configured to transmit the command to the electrical appliance, when the determining unit determines that the electrical appliance is confirmed to be the electrical appliance to be operated and determines that the electrical appliance is capable of performing the predetermined operation according to the command, to cause the electrical appliance to perform the predetermined operation at the predetermined time.

9. The communication apparatus according to claim 8, wherein the communication unit includes: a first communication unit configured to communicate with the electrical appliance without involving the Internet; and a second communication unit configured to communicate with the server or the electrical appliance via the Internet.

10. A non-transitory computer-readable recording medium on which a program is recorded, the program causing a computer to execute a communication method for operating an electrical appliance, the method comprising:

performing communication with a server via the Internet;

receiving an input for causing the electrical appliance to perform a predetermined operation at a predetermined time, from a user;

acquiring a command from the server in the communication performed in the performing of the communication, the command being for causing the electrical appliance to perform the predetermined operation at the predetermined time, according to the input received in the receiving of the input;

storing, in a storage unit, the command acquired in the acquiring and a plurality of association information items, one association information item among the plurality of the association information items being associated with the command, the command including the predetermined operation to be performed by the electrical appliance and time information related to a start time for starting performing of the predetermined operation;

displaying on a display unit the plurality of the association information items stored in the storing;

receiving a selection of an association information item among the plurality of the association information items displayed in the displaying;

requesting the electrical appliance to transmit appliance identification information;

receiving, from the electrical appliance, the appliance identification information requested in the requesting;

confirming whether the electrical appliance that has transmitted the appliance identification information is an electrical appliance to be operated, based on the appliance identification information received in the receiving of the appliance identification information;

determining that (i) when a current time is not past the start time acquired from the time information, the electrical appliance is capable of performing the predetermined operation according to the command associated with the one association information item, the selection of which is received in the receiving of the selection, and that (ii) when the current time is past the start time, the electrical appliance is incapable of performing the predetermined operation according to the command associated with the one association information item, the selection of which is received in the receiving of the selection; and when the electrical appliance is determined, in the determining, to be capable of performing the predetermined operation according to the command associated with the one association information item, the selection of which is received in the receiving of the selection, and when the electrical appliance is confirmed, in the confirming, to be the electrical appliance to be operated, transmitting the command acquired in the acquiring to the electrical appliance to cause the electrical appliance to perform the predetermined operation at the predetermined time.

11. The communication method according to claim 1, wherein the command acquired from the server in the acquiring is encrypted, and in the transmitting performed after the determining, when, in the determining, the electrical appliance is determined to be capable of performing the predetermined operation according to the command, the command which is encrypted is transmitted to the electrical appliance.

12. The communication apparatus according to claim 8, wherein the command acquired from the server by the acquiring unit is encrypted, and when the electrical appliance is determined, by the determining unit, to be capable of performing the predetermined operation according to the command, the communication unit is configured to transmit the command which is encrypted to the electrical appliance.

* * * * *